US010290876B2

(12) United States Patent
Prieto et al.

(10) Patent No.: US 10,290,876 B2
(45) Date of Patent: May 14, 2019

(54) LITHIUM-ION BATTERY HAVING INTERPENETRATING ELECTRODES

(75) Inventors: Amy L. Prieto, Fort Collins, CO (US); James M. Mosby, Fort Collins, CO (US); Derek C. Johnson, Johnstown, CO (US); Matthew T. Rawls, Denver, CO (US)

(73) Assignee: Prieto Battery, Inc., Fort Collins, CO (US)

( * ) Notice: Subject to any disclaimer, the term of this patent is extended or adjusted under 35 U.S.C. 154(b) by 227 days.

(21) Appl. No.: 13/565,617

(22) Filed: Aug. 2, 2012

(65) Prior Publication Data

US 2013/0196235 A1 Aug. 1, 2013

Related U.S. Application Data

(60) Provisional application No. 61/514,439, filed on Aug. 2, 2011.

(51) Int. Cl.
*H01M 4/80* (2006.01)
*H01M 4/04* (2006.01)
(Continued)

(52) U.S. Cl.
CPC ......... *H01M 4/808* (2013.01); *H01M 4/0402* (2013.01); *H01M 4/0452* (2013.01);
(Continued)

(58) Field of Classification Search
CPC ......... H01M 10/0525; H01M 10/0565; H01M 2300/0082; H01M 4/0402; H01M 4/0452;
(Continued)

(56) References Cited

U.S. PATENT DOCUMENTS

| 6,280,878 B1 | 8/2001 | Maruyama et al. |
| 2009/0214956 A1* | 8/2009 | Prieto et al. ............ 429/310 |

(Continued)

FOREIGN PATENT DOCUMENTS

| CN | 102017241 | 4/2011 |
| JP | 2011514630 | 5/2011 |

(Continued)

OTHER PUBLICATIONS

International Search Report, International Searching Authority, PCT/US12/49386, dated Oct. 19, 2012, pp. 1-14.
Arthur, Timothy S. et al., Three-dimensional electrodes and battery architectures, MRS Bulletin, vol. 36, Jul. 1, 2011, pp. 523-531, XP008156641.

(Continued)

*Primary Examiner* — Lingwen R Zeng
(74) *Attorney, Agent, or Firm* — Samuel M. Freund; Cochran Freund & Young LLC

(57) ABSTRACT

A lithium-ion battery including an electrodeposited anode material having a micron-scale, three-dimensional porous foam structure separated from interpenetrating cathode material that fills the void space of the porous foam structure by a thin solid-state electrolyte which has been reductively polymerized onto the anode material in a uniform and pinhole free manner, which will significantly reduce the distance which the Li-ions are required to traverse upon the charge/discharge of the battery cell over other types of Li-ion cell designs, and a procedure for fabricating the battery are described. The interpenetrating three-dimensional structure of the cell will also provide larger energy densities than conventional solid-state Li-ion cells based on thin-film technologies. The electrodeposited anode may include an intermetallic composition effective for reversibly intercalating Li-ions.

25 Claims, 12 Drawing Sheets

(51) Int. Cl.
  *H01M 4/134*      (2010.01)
  *H01M 4/1395*     (2010.01)
  *H01M 4/38*       (2006.01)
  *H01M 10/0525*    (2010.01)
  *H01M 10/0565*    (2010.01)
  *H01M 4/131*      (2010.01)
  *H01M 4/66*       (2006.01)

(52) U.S. Cl.
  CPC .......... *H01M 4/131* (2013.01); *H01M 4/134* (2013.01); *H01M 4/1395* (2013.01); *H01M 4/38* (2013.01); *H01M 4/661* (2013.01); *H01M 10/0525* (2013.01); *H01M 10/0565* (2013.01); *H01M 2300/0082* (2013.01); *Y02T 10/7011* (2013.01)

(58) Field of Classification Search
  CPC ...... H01M 4/134; H01M 4/1395; H01M 4/38; H01M 4/505; H01M 4/525; H01M 4/808; H01M 4/131; H01M 4/661; Y02E 60/122; Y02T 10/7011
  USPC .... 429/209, 211, 220, 221, 223, 224, 231.3, 429/315; 427/122, 126.3, 126.6, 58; 205/59
  See application file for complete search history.

(56) References Cited

U.S. PATENT DOCUMENTS

| | | | |
|---|---|---|---|
| 2009/0291368 A1* | 11/2009 | Newman et al. | 429/245 |
| 2010/0035153 A1 | 2/2010 | Thackeray et al. | |
| 2011/0171518 A1 | 7/2011 | Dunn et al. | |
| 2011/0183206 A1 | 7/2011 | Davis et al. | |
| 2011/0183207 A1* | 7/2011 | Hirose et al. | 429/218.1 |

FOREIGN PATENT DOCUMENTS

| | | |
|---|---|---|
| KR | 20040096381 A | 11/2004 |
| WO | 2009105773 A2 | 8/2009 |

OTHER PUBLICATIONS

Mosby et al., Direct Electrodeposition at Cu2Sb for Lithium-Ion Battery Anodes, Journal of the American Chemical Society. 130, No. 32, p. 10656-10661 (2008).

Li, J. et al., Materials processing for lithium-ion batteries, Journal of Power Sources, 196, p. 2452-2460 (2011).

Castrodeza et al, Processing of brass open-cell foam by silica-gel beads replication, Journal of Materials Processing Technology, 209, p. 4958-4962 (2009).

Long et al., Three-Dimensional Battery Architectures, Chemical Reviews, 104, p. 4463-4492 (2004).

En-Enany et al., In situ growth of polymer electrolytes on lithium ion electrode surfaces, Electrochemistry Communications 11, p. 2320-2323 (2009).

Gleria et el., Aspects of Phosphazene Research, Journal of Inorganic and Organometallic Polymer and Materials, 11, p. 1-45 (2001).

Kaskhedikar et al., Polymer electrolytes based on cross-linked cyclotriphosphazenes, Solid States Ionics, 177, 3129-3134 (2006).

Li et al., Synthesis and Characterization of Electropolymerized Poly(cyclophosphazene-benzoquinone), Chemistry of Materials, 9, p. 1451-1462 (1997).

Oyama et al., Dimercaptan-polyaniline composite electrodes for lithium batteries with high energy density, Letters to Nature, 373, p. 598-600 (1995).

Liu et al., Novel Solid REdox Polymerization Electrodes, Journal of the Electrochemical Society, 138, p. 1891-1895 (1991).

Lai et al., Ultrahigh-Energy-Density Microbatteries Enabled by New Electrode Architecture and Mirco packaging Design, Advance Materials, 22, p. E139-E144 (2010).

Ke et al., "Electroplating synthesis and electrochemical properties of macroporous Sn—Cu alloy electrode for lithium-ion batteries", Electrochimica Acta, Elsevier Science Publishers, Barking, GB, vol. 52, No. 24, Jul. 9, 2007, pp. 6741-6747, XP022145537.

H.C. Shin et al., "Three-dimensional Porous Copper-Tin Alloy Electrodes for Rechargeable Lithium Batteries", Advanced Functional Materials, vol. 15, No. 4, Apr. 1, 2005, pp. 582-586, XP055292237.

Korean Patent Application No. 10-2014-7005630, Notice of Preliminary Rejection, dated Jul. 19, 2018, eleven total pages.

\* cited by examiner

LITHIUM-ION BATTERY HAVING INTERPENETRATING ELECTRODES

CROSS-REFERENCE TO RELATED APPLICATIONS

The present application claims the benefit of U.S. Provisional Patent Application No. 61/514,439 for "Lithium-Ion Battery Having Interpenetrating Electrodes" which was filed on 2 Aug. 2011, the entire contents of which application is hereby specifically incorporated by reference herein for all that it discloses and teaches.

FIELD OF THE INVENTION

The present invention relates generally to batteries and, more particularly to lithium-ion batteries having interpenetrating electrodes.

BACKGROUND OF THE INVENTION

Lithium is the lightest and most electropositive element, making it well-suited for applications that require high energy density. As a result, lithium-ion (Li-ion, or $Li^+$) batteries have become the most common battery employed in a large variety of portable electronic devices. Success in the electronic market has promoted their use in hybrid electric vehicles (HEVs), plug-in hybrid electric vehicles (PHEVs), and electric vehicles (EVs). These applications as well the ever increasing demand for more powerful portable electronic devices has prompted the need for batteries that can consistently maintain large charge and large discharge current densities. Safety is also becoming an important factor in the design of new Li-ion batteries, especially for transportation applications. Currently, most Li-ion batteries include a porous separator which is soaked in a non-aqueous carbonate based electrolyte containing $LiPF_6$. Because of this electrolyte, these batteries are prone to catching fire and can expose the surrounding environment to toxic vapors, as discussed by J. Li et al. in Journal of Power Sources, 196, page 2452 (2011).

This has led some researchers to investigate solid-state Li-ion batteries as a safe alternative to conventional non-aqueous electrolyte based batteries. However, there are two principal issues that must be addressed before solid-state Li-ion batteries may become widely accepted for commercial applications. The first is the slow diffusion of Li-ions into the anode and the cathode, as well as slow diffusion within the solid-state electrolyte separating the two electrodes, which causes the charge/discharge rates of such batteries to be inferior to conventional Li-ion batteries. The second is a consequence of the first, in that solid-state Li-ion batteries generally include thin layers to compensate for the slow solid-state diffusion, but at the expense of energy density. The diminished energy density has limited the application of solid-state batteries to those which do not require high energy density such as: autonomous wireless sensors, powered cards, active RFID/RTLS, medical devices, and memory backup power.

While reducing the dimensions of the electrode materials improves the rate performance compared to bulk materials, reducing the distance between the cathode and anode cell structures has not been straightforward, and Li-ions are required to travel large distances between macroscopically separated electrodes. Planar geometries of batteries resulting from commonly used line-of-sight fabrication techniques significantly reduces the energy density that can be obtained.

SUMMARY OF THE INVENTION

Accordingly, it is an object of embodiments of the present invention to provide a solid-state lithium-ion battery effective for increasing the diffusion rate of $Li^+$ between the battery anode and cathode.

Another object of embodiments of the present invention is to provide a solid-state lithium-ion battery effective for increasing the diffusion rate of $Li^+$ between the battery anode and cathode, while maintaining useful energy densities.

Yet another object of embodiments of the invention is to provide a solid-state lithium-ion battery effective for increasing the rate of diffusion of $Li^+$ into and out of the battery anode and cathode.

Still another object of embodiments of the invention is to provide a method for fabricating solid-state Li-ion batteries having short Li-ion diffusion paths where uniform electrode and electrolyte layers are deposited using non-line-of-sight procedures.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the lithium-ion battery, hereof, includes in combination: a three-dimensional conducting porous foam current collector having an intermetallic material thereon, forming thereby a porous anode; a solid-state electrolyte conformally coated onto the anode for providing high resistance to electrical current and lithe resistance to the passage of lithium ions; and cathode material filling the pores in the coated anode.

In another aspect of the invention, and in accordance with its objects and purposes, the lithium-ion battery, hereof, includes in combination: an intermetallic, three-dimensional porous foam anode; a solid-state electrolyte conformally coated onto the anode material for providing high resistance to electrical current and little resistance to the passage of lithium ions; and cathode material filling the pores of the coated anode.

In yet another aspect of the invention, and in accordance with its objects and purposes, the method for producing a lithium-ion battery, hereof, includes the steps of: electrodepositing intermetallic anode material onto a three-dimensional conducting porous foam structure forming a porous anode; conformally coating a solid-state electrolyte onto the anode material; and filling the pores in the coated anode with cathode material.

In still another aspect of the invention, and in accordance with its objects and purposes, the method for producing a lithium-ion battery, hereof, includes the steps of: forming an intermetallic material three-dimensional porous foam structure anode; conformally coating a solid-state electrolyte onto the anode; and filling the pores in the coated anode with cathode material.

Benefits and advantages of the present invention include, but are not limited to, providing a battery having anode material in the form of a three-dimensional porous foam interpenetrated by cathode material and separated from the cathode by a thin, solid electrolyte, which permits short Li-ion diffusion times within the electrode materials and between them, while maintaining useful energy densities, and wherein multiple cells may be connected in parallel or in series to permit the desired capacity and or voltage to be obtained for the application being sought. The solid-state lithium-ion cell has improved safety characteristics over conventional Li-ion cells and is not limited to low-energy applications.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of a cross section of an embodiment of a three-dimensional porous foam electrode configuration of the present invention, wherein a porous metallic foam is coated with an intermetallic anode material, followed by a layer including a solid-state electrolyte; while

FIGS. 2A and 2B are scanning electron microscope (SEM) images of an example of porous metallic foam, FIG. 2A being a low-magnification SEM image of a commercially available bare copper foam, in which the micrometer dimensioned struts are clearly observable, while FIG. 2B is a high-magnification SEM image of the copper foam of FIG. 2A having $Cu_2Sb$ electrodeposited thereon (inset), the shorter dimensioned struts of the porous foam structure also being observable.

FIG. 3A is the voltage profile of electrodeposited $Cu_2Sb$ versus Li-metal, the inset showing the charge and discharge capacity of a thin film cycled between 1.2 and 0.05 V versus Li/Li$^+$, while

FIG. 4A shows the charge capacity at a rate of C/5, and the discharge capacities at different rates for a half-cell of $Cu_2Sb$ electrodeposited onto porous copper foam versus Li-metal, while

FIG. 5A illustrates cycling data for a full pouch cell with electrodeposited $Cu_2Sb$ on porous copper foam versus $LiCoO_2$ showing the voltage profile for the pouch cell, while

FIG. 6A is a cyclic voltammogram (CV) showing the first three cycles of electrodeposition of polyphosphazene (PPZ) on a platinum (Pt) electrode, while

FIG. 7A is a CV of the electrodeposition of PPZ, for a porous copper foam electrode, illustrating the first three, and the 30$^{th}$ cycles of the PPZ electrodeposition, while

FIG. 8A demonstrates the electronic and ionic properties of electrodeposited PPZ showing linear sweep voltammograms using negative and positive biases, while

FIG. 10A is a SEM image of synthesized $LiMn_{1.42}Ni_{0.42}Co_{0.16}O_4$ nanoparticles doped with Si(IV), while

FIG. 12A illustrates the voltage profile for the cyclic delithiation and lithiation of synthesized $LiMn_{1.42}Ni_{0.42}Co_{0.16}O_4$ nanoparticles versus Li-metal, while

FIG. 13A illustrates the cycling results of the voltage profile of the full cell for synthesized $LiMn_{1.42}Ni_{0.42}Co_{0.16}O_4$ nanoparticles versus electrodeposited $Cu_2Sb$, while

DETAILED DESCRIPTION OF THE INVENTION

Briefly, embodiments of the present invention include solid-state lithium-ion (Li$^+$) batteries having a three-dimensional porous foam structure, wherein Li-ion diffusion paths are short and practical energy densities are maintained, and methods for fabricating such batteries.

Nanostructured materials have been demonstrated to be useful for Li-ion batteries due to their high surface-area-to-volume ratio, which provides greater reversibility for the lithiation reaction and greater charge/discharge rates (See, U.S. Patent Publication No. US-2009-0214956-A1 for "Lithium-Ion Battery", Publication Date Aug. 27, 2009.). In accordance with the teachings of embodiments of the present invention, high surface-area-to-volume ratio can also be achieved on both nanoscale and micron scale by constructing cells having three-dimensional porous foam structure, that enhances the surface area when compared to planer structures. Porous foam structures having micron-scaled or smaller features that reduce the Li-ion diffusion length within the electrode materials and between the electrodes, which is advantageous in solid-state Li-ion batteries, because the conductivities of solid-state electrolytes are generally significantly lower than the conductivity of conventional liquid non-aqueous electrolytes. Further, unlike, two-dimensional planar architectures, porous foam structures allow this distance reduction to be achieved while maintaining practical energy densities. Another benefit of using a porous foam structure is that it permits a reduction in the amount of non-active material present in the cell/battery, such as current collectors, separators, and packaging, which also provides larger energy densities when compared with those for planar solid-state cells/batteries.

In what follows, the term "cell" means a functional pairing of an anode and cathode separated by an electrolyte, and the term "battery" means a collection of such "cells" to deliver the desired voltage and capacity for a chosen application.

Figure 1A:
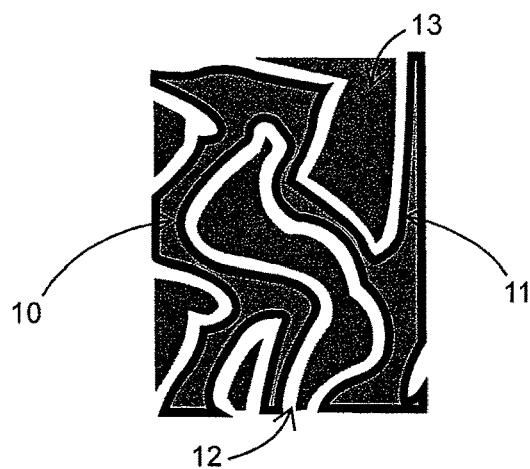
Figure 1B:
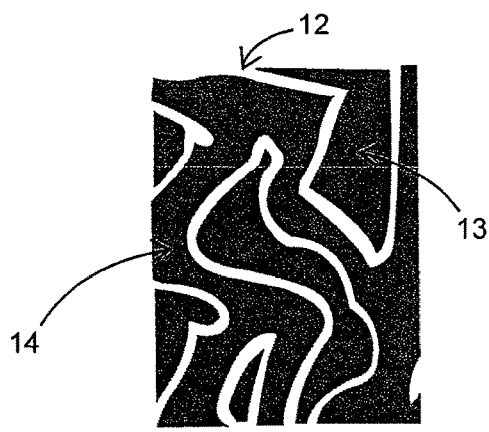
FIG. 1B illustrates a second embodiment of the foam electrode configuration, where an intermetallic material porous foam is coated with a layer including a solid-state electrolyte, such that for both the interdigitated cells of FIGS. 1A and 1B a cathode material fills the void space remaining after the porous structure is coated with the solid-state electrolyte.

Reference will now be made in detail to the present embodiments of the invention, examples of which are illustrated in the accompanying drawings. In the Figures, similar structure and/or compositions will be identified using identical reference characters. Turning now to FIGS. 1A and 1B, shown is a Li-ion cell/battery including anode, 11, having a three-dimensional porous foam structure, 10, which is coated with a polymer electrolyte, 12, surrounded by, and in electric communication with a cathode matrix, 13, forming thereby interpenetrating electrodes, and a method for producing such cells/batteries. Cells/batteries in which all three components: (1) anode 11; (2) electrolyte 12; and (3) cathode 13 are solid-state, provide benefits over conventional liquid electrolyte cells such as: a reduction in flammability, an increase in operating temperature range, and greater stability, which leads to longer cycle- and shelf-life. The architecture of these cells/batteries increases the diffusion rates of the Li-ions between the anode and cathode by reducing the Li-ion diffusion path length between the electrodes. This feature, coupled with the interpenetrating electrodes of the three-dimensional structure, permits high energy and power density cells/batteries with long cycle- and shelf-life to be constructed, in contrast to two-dimensional planar geometries.

Porous electrodes have been used as current collectors in electrochemical cells and batteries having common electrode configurations. In such configurations the anode and/or cathode material is coated onto a porous electrode, and the electrodes are submersed into a liquid electrolyte and separated by a membrane in a parallel plate fashion (See, e.g., U.S. Pat. No. 6,280,878, which discloses the use of a porous metal member to act as a current collector for both electrode materials for Li-ion batteries and as a holder of a gel electrolyte. U.S. Patent Publication No. 2010/035153A1, discloses the electrodeposition of composite electrodes to be used as an anode in Li-ion cells/batteries.). By contrast, embodiments of the present invention include a porous, three-dimensional structure, such as a porous foam structure, as a current collector for the anode material, which is covered with a thin, conformal solid-state electrolyte. The electrolyte acts as a template in which the cathode material is cast, filling the void spaces left by the previous steps. The improvement derives from the interdigitating or interpenetrating of the anode and cathode on this porous metal foam electrode which permits short Li-ion diffusion within the electrode materials and between them, while maintaining practical energy densities.

U.S. Patent Publication No. 2009/0291368 discloses using a porous carbon foam, onto which a solid-state electrolyte is oxidatively polymerized, followed by dispersing a thin layer of cathode slurry onto the solid-state electrolyte. By contrast, returning to FIGS. 1A and 1B hereof, embodiments of the present invention use a porous foam structure made of electrically conducting material 10 including, but not limited to nickel or copper, and coated with electrodeposited Li-ion anode material 11 such as an intermetallic composition, as an example. In another embodiment of the invention, a porous foam structure is fabricated by electrodeposition of the Li-ion anode material 14, itself. Advantages derive from the use of electrodeposition to form the Li-ion anode material in both cases above, the properties of the chosen Li-ion material 11, or 14, the selected solid-state electrolyte 12 and the chosen cathode 13 and the selected dimensions of the porous structure and the thicknesses of each component of the Li-ion cell/battery, which can be selected to maximize cell and battery performance. In what follows "porous foam" will be utilized as exemplary of structures 11 (electrically conducting porous foam structure coated with electrodeposited Li-ion anode) and 14 (porous foam structure comprising the Li-ion anode material, and fabricated by electrodeposition), except where specifically discussing one or the other.

Porous foam 10 may comprise copper, but may include nickel, as a substrate and current collector. The structure of porous foam 10 may be modified such that the porosity optimizes the power density and/or the energy density of the cell. The range of the porosity of the porous foam which achieves this optimization is between about 60% and approximately 85%, but could be extended to between approximately 50% and about 97%. The intermetallic anode material 11 specifically Cu$_2$Sb, is deposited onto the surface of the porous foam at a single potential, which for Cu$_2$Sb is about −1.05 V versus SSCE.

Another embodiment of the present method utilizes electrochemical deposition to create a three-dimensional porous foam structure, 14, comprising an intermetallic anode material, for example Cu$_2$Sb. This may be achieved using a space holder, for example SiO$_2$ (silica-gel) beads, for an open-cell porous structure. The porosity and structure of the porous foam can be controlled by the size and shape of the space holder used. The deposition of the porous foam structure may be performed using a conventional three-electrode apparatus, where the working electrode may be a metallic strip, copper or nickel as examples, but not limited thereto, suspended in a container having the shape of the desired outer dimensions of the porous foam. A counter electrode, for example, stainless steel mesh, may be used to cover the inside of the container. The spaceholder, for example $SiO_2$ beads, and the deposition solution are placed in the container. The reference electrode is placed in the deposition solution, and the intermetallic material, for example $Cu_2Sb$, may be electrodeposited in the void space left by the space holder by applying a constant potential, current or by pulsing a potential or current, for example −1.05 V versus SSCE for $Cu_2Sb$. The $SiO_2$ beads, may then be chemically etched, using HF solution for $SiO_2$, leaving the open-cell porous intermetallic $Cu_2Sb$, structure as is taught by Castrodeza et al. in Journal of Materials Processing Technology, 209, page 4958 (2009). Similar to the first embodiment, this embodiment provides the ability to control the dimensions of the porous foam struts, 15 and 16, to maximize cycle performance and allow the properties of the final cell to be optimized for power and/or energy density. In this embodiment there is an absence of an inactive, towards Li-ion intercalation, porous metallic substrate, which is a source of "non-active" mass in a cell/battery. The absence of this non-active material in the electrode increases the cell's/battery's energy and power density, because a higher percentage the electrode's mass is active to the incorporation of Li-ions. Before lithiation, the porous intermetallic foam is electrically conductive, and as it becomes lithiated the extruded Cu will help to maintain good electronic conductivity. The conductivity of the porous foam in this embodiment may be increased by doping the foam with a metallic element, such as but not limited to copper or nickel, during the electrodeposition. Such doping may be achieved by changing the concentration of the $Cu(NO_3)_2$ in the deposition solution and or by applying a different deposition potential. An example of this controlled doping is reported in Mosby et al. in Journal of the American Chemical Society, 130, Number 32, page 10656 (2008). Also, the porous foam may be doped with nickel by adding $Ni(NO_3)_2$ to the deposition solution.

Electrical connection is made to the porous foam prior to the deposition by attaching a conducting lead, such as, but not limited to copper or nickel, by means of resistive or ultrasonic weld, 51. This electrical connection permits application of the required potential or current for the electrodeposition of the intermetallic anode, for example $Cu_2Sb$, and subsequently the solid-state electrolyte layer, and will also function as the negative tab, 52, for a Li-ion cell, or permit connection of several individual cell tabs 52 to the negative tab comprising a battery. The intermetallic anode materials, including $Cu_2Sb$, display excellent properties for use in Li-ion cells/batteries: (a) increased charge storage capacity; (b) increased charge/discharge rates; and (c) reduced hazard of plating lithium metal onto the anode. The anode material electrochemically deposited onto or as the porous foam exhibits high surface area while maintaining excellent electrical contact to the porous foam. The thickness of the electrodeposited anode material can range from about 50 nm to about 10 μm, more preferably between approximately 200 nm and approximately 5 μm and optimally between about 500 nm and about 3 μm, which is controlled by the deposition parameters employed. The control over thickness is beneficial as it allows the cycle performance of the anode material to be optimized, and provides one method for matching the Li-ion capacity of the anode material with the Li-ion capacity of the cathode material.

Figure 1C:
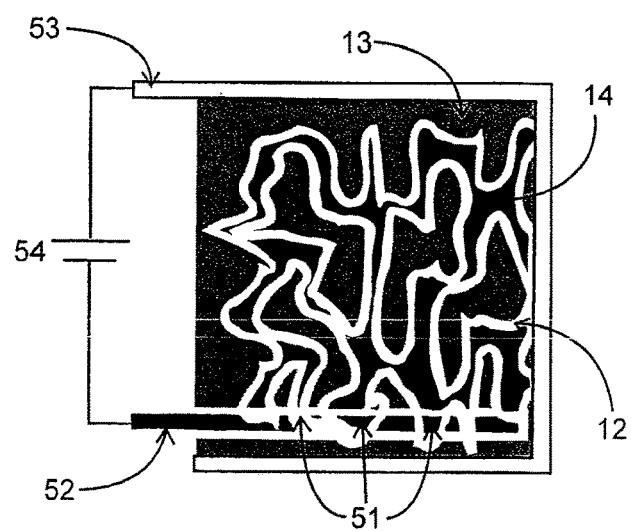
FIG. 1C is a schematic representation of a cross section of the embodiment of the Li-ion cell shown in FIG. 1B hereof, wherein the intermetallic material porous foam is placed in electrical communication with a metallic lead by resistive welding, and is covered with an electropolymerized solid-state layer of electrolyte, the cathode slurry then being cast into the void space of the porous foam and placed in electrical communication with a second electrode, which is wrapped around the entire cell, and electrically isolated from the anode structure by the solid-state electrolyte layer.

As shown in FIG. 1C, electrical contact is established with the cathode slurry 13 after it is applied to the three-dimensional structure 11 (FIG. 1A) or 14 (FIGS. 1B and 1C), but before it is cured at temperature around 100° C. in a vacuum oven. In accordance with embodiments to the present invention, the solid-state electrolyte 12 is electrodeposited onto the entire surface of the anode covered three-dimensional porous foam structure 11 or 14, as well as the tab 52 which is in electrical communication 51 with the structure which used to deposit the anode and solid-state electrolyte, and will also function as the negative tab in a complete cell. The entire structure as a whole is then placed on top of a cathode current collector, 53, comprising a conducting metal, for example, but not limited to aluminum, in the form of a thin foil or grating, which is dry or which has previously been wetted with cathode slurry. To this assembly, cathode slurry 13 is applied, via the methods describe above, filling the void space of the three-dimensional porous foam structure 11 or 14 making contact with the cathode current collector 53 and/or the slurry already present on the current collector. To improve electrical conductivity of the cathode, the cathode current collector 53 may be wrapped around the porous three-dimensional structure 11 or 14, which is filled with cathode material 13 to make contact to the slurry which is present at the top and side of the porous three-dimensional structure. Once this has been achieved, the entire assembly is cured at temperatures around 100° C. in a vacuum oven, completing the fabrication of a full Li-ion cell with interpenetrating anode 11 or 14 and cathode 13 electrodes. The voltage drop may be measured between the leads attached to the current collectors associated with the anode, 10 or 14, and that for the cathode 53, using a voltage measuring apparatus. This location may also be used to connect an external load for drawing current from the cell, and/or for connecting the positive and negative terminals of the cell to battery, 54, for charging the cell.

Figure 2A:
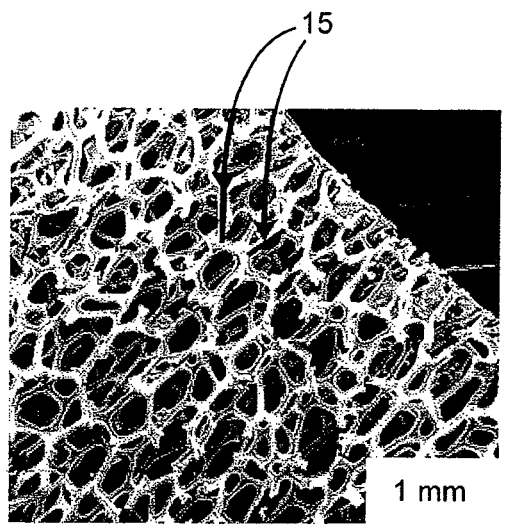
Figure 2B:
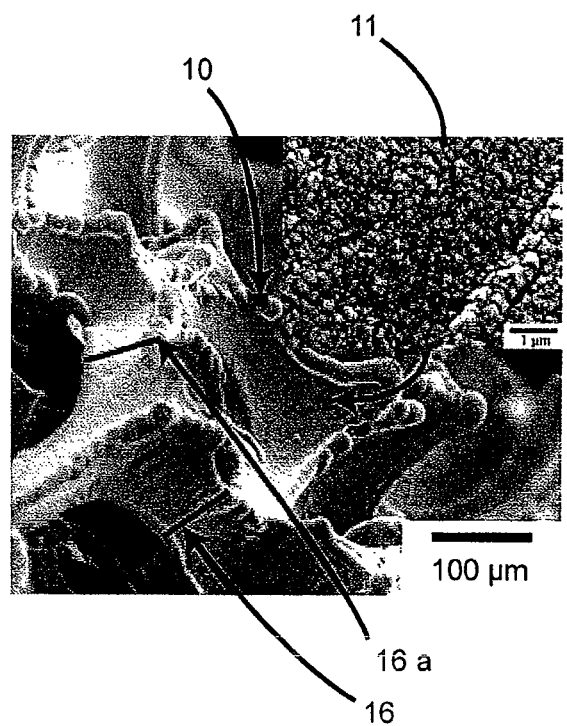

FIGS. 2A and 2B are scanning electron microscope (SEM) images of an example of porous metallic foam 10, with FIG. 2A being a low-magnification SEM image of a commercially available bare copper foam purchased from EFoam in which micrometer-dimensioned struts, 15, are readily observable, while FIG. 2B is a high-magnification SEM image of copper foam 10 of FIG. 2A having $Cu_2Sb$ electrodeposited thereon 11 (inset), the shorter dimensioned struts, 16, 16a, of the porous foam structure also being observable. Struts 15 may have micron dimensions (for example, lengths in the range between about 15 μm and about 500 μm, widths 16 in the range between approximately 1 μm and approximately 120 μm, and depths 16a in the range between about 1 μm and approximately 120 μm. The use of intermetallic anode materials provides significant improvements in the battery performance over carbon foams, as will be described hereinbelow.

Dendritic growth of metallic lithium onto the commonly used carbon-based anodes can led to shorts in the battery and may cause safety issues. Therefore, new anode materials and morphologies are desired in which these safety issues, as well as the capacity and the charge/discharge rates, can be improved over carbon-based materials. Intermetallic compounds offer the possibility of improved capacity, a highly reversible reaction with lithium, and a lithium intercalation potential that may be less negative than the deposition potential of metallic lithium, the latter property being useful for eliminating dendritic growth of elemental lithium on the electrode. A drawback of using intermetallics as anode materials has been the irreversible loss in capacity during cycling due to large volume changes which result in pulverization of the electrode during cycling and, consequently, a loss of electrical contact between the anode and the remainder of the cell. However, $Cu_2Sb$ is an intermetallic composition that does not exhibit large volume changes during the charging and discharging, and Fransson et al. in Electrochemistry Communications, 3, page 317 (2001) has reported that a 90% capacity retention can be obtained after 25 cycles. Another benefit of $Cu_2Sb$ is that its operating potential precludes lithium metal plating, which improves the safety of the cell. The use of $Cu_2Sb$ electrodeposited onto a three-dimensional porous foam structure, 10, or in the form of a three-dimensional porous foam structure itself, has the additional benefit that anode materials with such structures, with inherently high surface-to-volume ratios, have been found to be less affected by pulverization resulting from large volume changes. Such structures also provide an electronic backbone throughout the cell mass which improves the electrical conductivity of the electrode during charging and discharging.

As will be described hereinbelow, $Cu_2Sb$ may be directly deposited onto a conducting substrate with precise control of composition and thickness under mild conditions, onto complex shapes and into deep recesses with excellent electrical contact without requiring post-annealing. This permits $Cu_2Sb$ to be electrodeposited onto or as an electrically conductive three-dimensional porous foam. Details of the electrodeposition of $Cu_2Sb$ can be found in Mosby et al. in the Journal of the American Chemical Society, 130, Number 32, page 10656 (2008), wherein it is reported that thin films of $Cu_2Sb$ can be directly deposited onto metal current collectors from aqueous citric acid solutions containing $Cu(NO_3)$, and $Sb_2O_3$, at a pH of 6 using a potential of −1.05 V versus a saturated sodium calomel electrode (SSCE). The films obtained were found to be uniform polycrystalline $Cu_2Sb$ with a preferred orientation along the (001) direction.

It has been suggested by others that solid-state electrolytes would have properties that would be advantageous for Li-ion batteries. These properties include, but are not limited to, long cycle-life, long shelf-life, diminished fire hazard, large operating temperatures, and less stringent packaging requirements, than their liquid-based counterparts. Such proposed solid-state electrolytes include ceramic, polymeric or composite materials, and are generally incorporated into two-dimensional planar cells. In what follows the term "solid-state electrolyte" means a layer that acts as both the electrolyte and separator in the Li-ion cell. Thus, this "solid-state electrolyte" layer provides a high resistance of electrical current (that is, to the passage of electrons) between the anode material having the three-dimensional porous foam structure, and the cathode material filling in the void space of the porous structure, while Li-ions are allowed to pass through the layer with little resistance. The characteristics of the solid-state electrolyte identified in embodiments of the present invention, will have similar requirements to those for solid-state electrolytes designed for any Li-ion cell/battery comprising interpenetrating anode and cathode electrodes. The requirements for an optimized electrolyte in three-dimensional cells/batteries have been well characterized in several recent publications and can be summarized according to a review by Long et al. in Chemical Reviews, 104, page 4463 (2004) by the following statement: development of the electrolyte system for these high surface area cell architectures requires layers which can be applied as very thin conformal coatings of Li-ion conducting dielectric material. A conformal coating is a uniform and pinhole-free coating which may be formed by electrodeposition, polymerization and reductive polyermization, as examples.

In certain embodiments of the present invention, self-limiting electrodeposition (deposition of electrically insulating films impervious to the deposition solvent and monomer) is used to deposit uniform, pinhole-free solid-state electrolyte layers onto the porous three-dimensional porous foam structure of the anode. Electrodeposition is an effective method for application of such layers as it is well understood at the production level, allows control of thickness, and can provide uniform and conformal depositions onto non-line-of-sight structures, for example a porous foam structure (See, En-Enany at al. in Electrochemistry Communications 11, page 2320 (2009).). The performance and manufacturing goals of a complete cell embodiment of the present invention dictate the requirements for the electrolyte and or separator layer be: the reductive (as the deposition will be performed directly onto the anode surface) electrodeposition of an ultrathin (in the range of between about 10 nm and about 1000 nm, more preferably in the range between approximately 25 nm and about 500 nm, and advantageously in the range between about 50 nm and approximately 250 nm thick) organic polymer layer which functions as both the electrolyte and separator. The thickness of the solid-state electrolyte layer 12 will depend on the dimensions of the three-dimensional porous structure, such as porous foam 15 and 16 thickness of the anode material, for example $Cu_2Sb$ 11 and the required volume of cathode material 13, but should not significantly modify the porosity of the three-dimensional porous foam structure. Optimal performance of the proposed cell/battery architecture may require that the solid-state electrolyte 12 demonstrate sufficient dielectric performance (high dielectric strength) to permit cell/battery operation over large voltage ranges, such as between about 0 V to approximately 5 V versus $Li/Li^+$, thereby allowing a variety of cathode materials to be introduced into the porous three-dimensional porous foam structure, including, but not limited to, high voltage (4.9 V versus $Li/Li^+$) cathode materials. Further, the solid-state electrolyte 12 should be sufficiently flexible to permit the requisite electrode expansions, of both the anode 11 and cathode 13 materials, during lithiation without failure, and must exhibit sufficient Li-ion conductivity to permit high power operation of the cell/battery as demonstrated by Long et al. Chemical Reviews, 104, page 4463 (2004). Several possible materials can be electrodeposited to form solid-state electrolytes meeting these requirements including, but not limited to, polyphosphazenes (PPZ).

Polyphosphazene polymers comprise a diverse group of materials having broad industrial applications and include an intrinsically flexible repeating $[NPR]_n$ backbone with side chains which can be customized for a given application. Generally, polymers in this class boast excellent chemical resistance to organic solvents and are flame retardant as shown by Gleria et al. in Journal of Inorganic and Organometallic Polymer and Materials, 11, page 1 (2001). Polyphosphazene battery electrolytes have been studied with one of the highest salt-in-polymer dry electrolyte Li-ion conductivities ($10^{-5}$ S $cm^{-1}$) reported using poly[bis(2-(2-methoxyethoxy)ethoxy)phosphazene] by Kaskhedikar et al. in Solid State Ionics, 177, 3129 (2006). However, all previous electrolyte applications of polyphosphazenes have included solution deposition, for example drop-casting, which cannot provide sufficiently thin, conformal coatings capable of meeting the rigorous requirements of a solid-state electrolyte, 12, for an interpenetrating Li-ion cell, such as one based on a porous foam. Polyphosphazene polymers can be electrochemically polymerized onto metal surfaces, for example intermetallic anode materials, in particular $Cu_2Sb$, 11 and 14. This was first demonstrated by Kaskhedikar et al. in Solid State Ionics, 177, page 3129 (2006). The electrodeposition proceeds through an EC mechanism (an electrochemical reaction followed by a chemical reaction), wherein a crosslinker species is reduced electrochemically and subsequently chemically reacts with a cyclic phosphazene precursor as discussed by Li et al. in Chemistry of Materials, 9, page 1451 (1997). A crosslinked, three-dimensional polyphosphazene network is formed having a thickness which may be controlled by the deposition method and total charge passed. While numerous potential crosslinkers may be utilized to tailor solid-state electrolyte properties, quinone derivatives, for example 1,4-naphthoquinone, yields a dielectric film having dielectric strength, while benzoquinone films appear to be electrically conductive. The ionic conductivity of the quinone polymer backbone can be improved by the addition of polyethylene oxide units, and or sulfonate groups. Another beneficial modification of the polymer is the addition of a thermally curable unit which would allow for the conformal coating to be hardened post deposition, for greater mechanical strength.

Once solid-state electrolyte 12 has been shown to be conformally coated onto the anode material 11 or 14 which acts as a base for an interpenetrating Li-ion cell, for example an anode having a porous foam structure, without the presence of defects or pinholes, which can be confirmed through various procedures such as redox shutoff experiments, the positive electrode 13 in the form of a particle-based slurry is applied to complete the electrochemical cell/battery. This slurry may include: (1) an active cathode material in particulate form; (2) a polymer binder, such as polyvinylidene fluoride (PVDF); (3) a particulate, carbon-based conducting additive; and (4) a solvent that dissolves the polymer binder and provides a good homogeneous suspension of the active material and conductor such as N-methyl-2-pyrrolidone (NMP). Suitable Li-ion cathode materials may include oxides, spinels, phosphates and polymer cathodes, as long as their lithiation potential is more positive than the lithiation potential of the anode. Examples include, but are not limited to, $LiCoO_2$, $LiMnO_2$, $LiMn_{1.42}Ni_{0.42}Co_{0.6}O_4$, $Li_{1.5}Ni_{0.25}Mn_{0.75}O_{2.5}$, $LiNi_{0.5}Mn_{1.5}O_4$, $LiFePO_4$, $LiMnPO_4$, and 2,5-dimercapto-1,3,4-thiadiazole. While the composition of the slurry may vary, a common weight percent is about 60% solvent, approximately 28% active material, about 8% conductor, and about 4% polymer binder. In the incorporation of such slurries into a three-dimensional porous foam structure, the slurry 13 through either its application or composition, must not damage the solid-state electrolyte 12. Thus, the application of this electrode to complete the cell/battery must not induce defects or pinholes, thereby causing an internal short circuit that would result in a defective cell/battery. A procedure for applying the cathode slurry without causing damage to the solid-state electrolyte 12 includes: (1) determining the compatibility of the solvent with the solid-state electrolyte; (2) determining an appropriate binder based on the solvent; (3) ensuring that the cathode packing density is high to optimize the utilization of the void space which remains after the electrodeposition of the solid-state electrolyte onto the anode material of the three-dimensional porous foam structure; and (4) ensuring that the solution remains homogeneous during the application and curing process.

Since exposure to certain solvents has been shown to induce defects in thin, polymer based solid-state electrolytes, determining the compatibility of the slurry's solvent with the solid-state electrolyte 12 is important. A common solvent used in conventional electrode slurries is NMP, which is known to be effective in dissolving a wide range of polymers, especially those polymers that have been reductively electrodeposited. More problematic is that this slurry, once applied, is typically heated to temperatures on the order of 100° C. to facilitate the curing process. The elevated temperature may accelerate the dissolution process of solid-state electrolyte 12. An embodiment of the present invention employs triethyl phosphate (TEP) as a substitute for NMP, since this solvent has been found to be compatible with a polyphosphazene solid-state electrolyte 12. As in conventional Li-ion batteries, binders play an important function for the positive electrode, since they secure the constituents of the electrode in the void space of the interpenetrating cell/battery, while simultaneously keeping the cathode material, typically nanoparticles, in electrical contact with the positive electrode current collector 53. Important properties of a binder then include: Li-ion conductivity, elasticity, tensile strength, degree of adhesion to the current collector, and crystallinity. PVDF binder material has these properties, is compatible with the TEP solvent, and was therefore used as the binder for the positive electrode 13. As stated, the chosen solvent-binder mixture must effectively wet the surface of the solid-state electrolyte 12 as this affects the packing density. For example, if the polymer solid-state electrolyte 12 is hydrophobic, and the slurry solvent is water-based, the packing density will be poor and the interfacial contact resistance between the solid-state electrolyte and the positive electrode 13 will be high. Once a suitable binder-solvent combination which is compatible with the solid-state electrolyte 12 has been identified, the solution homogeneity of the slurry must be considered. Thus, the buoyancy of both the cathode nanoparticles and conductor particles must be accounted for.

In order that the cathode nanoparticles and conductor particulates stay well dispersed in the solvent in which the binder has been dissolved, the net force on the particles must be zero. Because the particles are suspended in a viscous fluid, the two forces that must be taken into consideration are gravity and buoyancy. This can be expressed as:

$$F_{net} = m_1 g - \rho_f V_1 g = m_2 g - \rho_f V_2 g = 0, \qquad \text{Eq. (1)}$$

where g is gravity, ρ is density, and V is volume of fluid displaced. The subscripts f, 1, and 2 correspond to the fluid composed of the solvent and binder, the cathode, and the conducting material, respectively. Once the cathode nanoparticles have been synthesized and the average particle diameter characterized, the average particle size of the conducting material needed to make $F_{net}$ equal to zero can be calculated. Conversely, if one starts with an average conductor particle size, the diameter of the cathode nanoparticles that would result in the most homogenous solution can be calculated. To determine suitable radii, Eq (1) can be expanded by taking into account that:

$$V_i = \frac{4}{3}\pi r_i^3 \qquad \text{Eq. (2)}$$

and $$m_i = \frac{4}{3}\pi r_i^3 \rho_i, \qquad \text{Eq. (3)}$$

where $r_i$ is the particle radius. Substituting Eq (2) and (3), into Eq (1) and simplifying yields:

$$\left(\frac{4}{3}\pi r_1^3 \rho_1 g - \rho_f \frac{4}{3}\pi r_1^3 g\right) = \left(\frac{4}{3}\pi r_2^3 \rho_2 g - \rho_f \frac{4}{3}\pi r_2^3 g\right) \quad \text{Eq. (4)}$$

$$r_1^3(\rho_1 - \rho_f) = r_2^3(\rho_2 - \rho_f) \quad \text{Eq. (5)}$$

$$r_1 = r_2 \left(\frac{\rho_2 - \rho_f}{\rho_1 - \rho_f}\right)^{1/3} \quad \text{Eq. (6)}$$

In actuality, there will be an average particle diameter and a particle size distribution but as long as the buoyancy, is properly taken into consideration, the relative concentrations of active cathode material to conductor material will be homogeneous throughout the positive electrode, 13. Non-homogeneous mixtures of these particles will adversely affect both the electronic and ionic conductivity of the positive electrode, 13, and in turn the performance of the overall cell/battery.

In another embodiment of the present invention, this difficulty may be avoided by using conducting polymers, for example, but not limited to, polyaniline which was used by Oyama et al. in Nature, 373, page 598 (1995). However, the ability to solvate the needed mass of polymer in the solvent while still maintaining the appropriate electronic properties of the electrode can be problematic. Another advantage of employing a conducting polymer is that the Li-ion conductivity can also be engineered into the conducting polymer, thereby increasing the overall ionic conductivity of the electrode. Swelling of the traditional PVDF binder with liquid electrolyte typically fulfills this function as reported by Liu et al. in Journal of the Electrochemical Society, 138, page 1891 (1991).

Care must be taken to ensure a high cathode packing density in order to completely fill the void space of the three-dimensional porous foam structure without cavities. Cavities within the positive electrode, 13, and low-packing density may result in capacity mismatch and also reduce the performance of the cell/battery due to increases in resistance to electron and Li-ion transport. Two parameters of the slurry that dictate packing density are the particulate size, of both the cathode and conducting material, and the slurry viscosity. First, with respect to particulate size, particles with a narrow size distribution and nanoscale dimensions are desired. This is important since if the particles dimensions are similar to the dimensions of the void space of the three-dimensional porous foam structure, in particular the smallest opening, the cathode slurry will be inhibited from filling all of the void space. Once the particles are reduced to dimensions much smaller than the smallest opening of the three-dimensional porous foam structure, for example to nanoscale dimensions, the slurry viscosity can be optimized by adjusting the percent of the solvent in the slurry mixture. The optimized slurry viscosity will be one that allows the application of the cathode slurry to the interpenetrating cell/battery, such that all void space is filled, in a timely manner. Slurry optimization will allow the integration of the positive electrode, 13, into the interpenetrating three-dimensional porous foam structure, by traditional means such as slot-dye coating and or dip coating methods. As the void space becomes small, approaching the nanoscale, other methods must be pursued in which external forces are applied, whether they be electronic or forced convection via a pressured gradient, to induce the transport of the slurry into the pore structure as shown by Lai et al. in Advance Materials, 22, page E139 (2010).

Having generally described the invention, the following EXAMPLES provides additional details:

EXAMPLE 1

Anode Preparation:

A. $Cu_2Sb$ Films:

The direct electrodeposition of crystalline, stoichiometric $Cu_2Sb$ films from aqueous solution at room temperature onto copper electrodes at a single potential is first described. $Cu_2Sb$ films were electrodeposited from aqueous 0.4 M citric acid solutions ($H_3Cit$, ≥99.5%, Aldrich) containing 0.025 M antimony (III) oxide ($Sb_2O_3$, nanopowder, ≥99.9%, Aldrich), and 0.08 M copper (II) nitrate hemipentahydrate ($Cu(NO_3)_2$, ≥99.9%, Aldrich), prepared by adding the citric acid to Millipore water (18 MΩ) followed by the addition of $Sb_2O_3$. The complete dissolution of the $Sb_2O_3$ was aided by mechanical stirring after which the $Cu(NO_3)_2$ was added. The pH was then raised to 6 by the addition of 5 M potassium hydroxide (KOH, ACS certified, Fisher). The $Cu_2Sb$ films were obtained by performing bulk electrolysis onto both sides of copper foil at 50° C. at a potential of −1.05 V versus a SSCE. A custom deposition cell having four electrodes was used to keep both sides of the copper foil parallel to the counter electrode and the same distance from the reference electrode. This cell includes two counter electrodes, stainless steel mesh, that are connected in parallel, a reference electrode, SSCE, and a working electrode. The working electrode was copper foil (0.02 cm, ≥99.9%, McMaster-Carr) attached to nickel tabs (4.8×0.4×0.009 cm, MTI) using resistive welding. The nickel tab was used to make electrical connection to the working electrode for the deposition of $Cu_2Sb$. The time of the depositions were varied to control the thickness of the deposited $Cu_2Sb$.

Figure 3A:
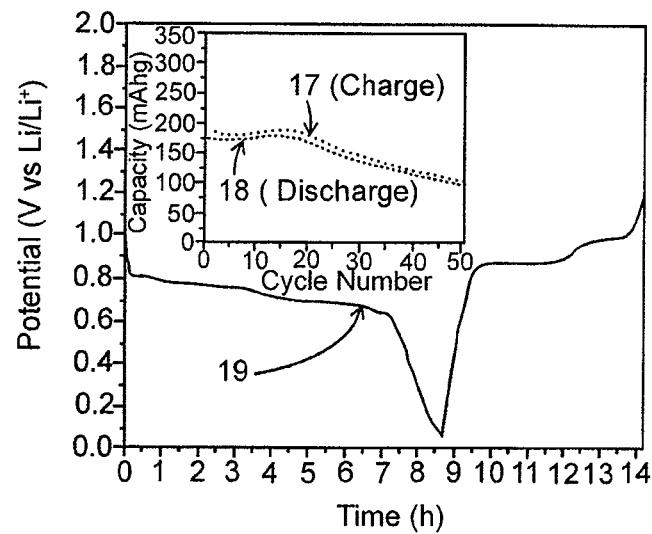

$Cu_2Sb$ films deposited following the procedures given above were analyzed using X-ray photoelectron spectroscopy (XPS), X-ray diffraction (XRD), and energy dispersive X-ray spectroscopy (EDS). The results of these analyses confirm that the violet films obtained from the electrodeposition are stoichiometric $Cu_2Sb$ with good crystallinity and uniformity. More details on the electrodeposition and characterization of $Cu_2Sb$ thin films can be found in Mosby et al. in Journal of the American Chemical Society, 130, Number 32, page 10656 (2008). Preliminary testing of the battery performance of electrodeposited films of $Cu_2Sb$ show the films intercalate Li-ions reversibly as seen in FIG. 3A. These tests were performed versus lithium metal, in Swagelok type cell using a three-component electrolyte. The electrolyte was comprised of 1 M lithium perchlorate ($LiClO_4$, ≥99.99%, Aldrich) in a mixture of ethylene carbonate (EC, anhydrous, ≥99%, Aldrich), diethyl carbonate (DEC, anhydrous ≥99%, Aldrich), dimethyl carbonate (DMC, anhydrous, ≥99%, Aldrich) (1:1:1 by volume). The $Cu_2Sb$ was charged from the open circuit potential (2 V versus $Li/Li^+$ to a potential just positive of plating lithium metal (0.05 V versus $Li/Li^+$). Subsequent cycles were run between 1.2 and 0.05 V versus $Li/Li^+$. The consequences of the volume change (94%) that occurs during the transition between $Cu_2Sb$ and $Li_3Sb$ were found to be significant during the first few cycles. The active material was observed to slough off from the copper current collectors during the first 10-15 cycles leading to significant capacity loss. After the $Cu_2Sb$ film thickness was reduced an order of magnitude, by reducing the electrodeposition time and the voltage window of the cycling experiments was changed to 1.2-0.6 V versus $Li/Li^+$, the capacity retention, 17 and 18, of the films was improved.

Thin films of electrodeposited $Cu_2Sb$ were also tested in full-cells versus $LiCoO_2$. The full-cell tests were performed in standard polymer Li-ion pouch cells made with laminate aluminum packaging material. Five copper substrates, still attached to a nickel tab, with electrodeposited $Cu_2Sb$ were covered with battery separator (0.0025 cm thick, 99.99%, MTI). Six aluminum sheets (5×6×0.013 cm, 99%, McMaster Carr) attached to an aluminum tab (4.8×0.4×0.009 cm, 99.99%, MTI) were placed between the copper sheets. Both sides of the aluminum sheets were covered with a $LiCoO_2$ cathode slurry. The cathode slurry consisted of 88 wt % lithium cobalt(III) oxide ($LiCoO_2$, ≥99.8%, Aldrich), 6 wt % acetylene black, and 6 wt % poly-(vinylidene fluoride) (PVDF, Aldrich) dissolved in NMP (anhydrous, ≥99.5%, Aldrich). The slurry was cast onto the aluminum foil, after which it was heated at 60° C. under air for 1 h and at 110° C. under vacuum for 90 min. The pouch cells were cycled using electrolyte that consisted of 1 M lithium hexafluorophosphate ($LiPF_6$, ≥99.99%, Aldrich) in either a (1:1:1 by vol.) EC, DEC, DMC or in (3:7 by vol.) EC, DEC solution.

Figure 3B:
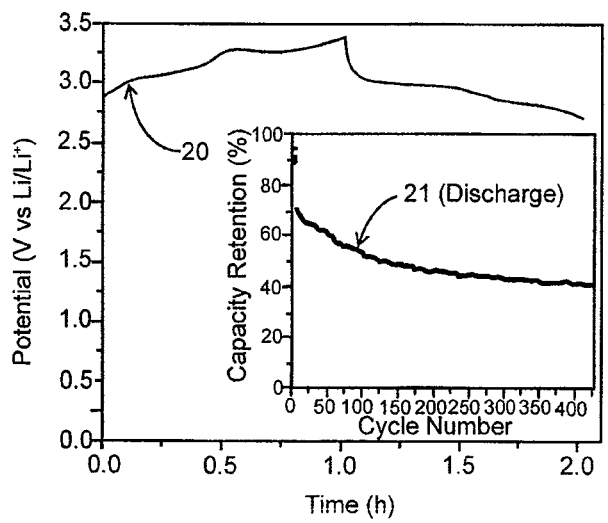
FIG. 3B is the voltage profile of a full pouch cell consisting of electrodeposited $Cu_2Sb$ onto copper foil, a commercially available polypropylene-based porous separator to electrically isolate the anode and cathode, a liquid electrolyte consisting of a 3:7 ratio by mass of ethylene carbonate:dimethylcarbone with 1 M LiPF$_6$, and LiCoO$_2$ cathode material mixed in a standard slurry containing PVDF and graphite and attached to an aluminum foil current collector, the inset showing the discharge capacity retention of the full-cell cycled between 3.4-2.7 V versus Li/Li$^+$.

Reducing the thickness of the electrodeposited $Cu_2Sb$, by decreasing the deposition time to 1 min., permits the material to be charge/discharge for over 50 cycles without cleavage from the copper current collector as demonstrated by the capacity retention, 17 and 18, as shown in the inset of FIG. 3A. The voltage profile, 19, of $Cu_2Sb$ versus Li-metal shown in FIG. 3A consist of two plateaus during the lithiation and delithiation which correspond to the transformation of $Cu_2Sb$ to $Li_2CuSb$ and $Li_3Sb$, and then back to $Cu_2Sb$. From examining the charge 17 and discharge 18 of $Cu_2Sb$ cycled between 1.2-0.5 V versus Li-metal, it can be seen that the capacity increases during the early cycles and then decreases as the cycling progresses. This behavior is characteristic of the pulverization causing a decrease in particle size, permitting more active material to be utilized in the beginning, followed by further pulverization which then causes the particles to lose electrically connection to the current collector and thus reduces the amount of material reactive towards Li-ion intercalation. It was found that upon changing the voltage window in which the electrodeposited $Cu_2Sb$ is cycled to 1.2 to 0.6 V versus $Li/Li^+$ that this pulverization could be diminished and an enhancement of the coulombic efficiency and capacity retention during cycling is obtained. The absence of the characteristic increase in capacity retention, 21, during the cycling of a full-cell of electrodeposited $Cu_2Sb$ versus $LiCoO_2$ as shown in FIG. 3B indicates the degree of pulverization has been greatly diminished by controlling the voltage window. The voltage profile, 20, of the full-cell containing $Cu_2Sb$ and $LiCoO_2$, as shown in FIG. 3B, shows that both plateaus representing the reaction of $Cu_2Sb$ with Li-ions are still present in the smaller voltage window of between 3.4 V and 2.7 V versus $Cu_2Sb$. Although a high rate (approximately 1 C) was used to charge and discharge the cell, the plateaus corresponding to the lithiation and delithiation of $Cu_2Sb$ are still present in FIG. 3B and it can be seen that full-cells of $Cu_2Sb$ versus $LiCoO_2$ provide an operating voltage of 3.0 V during the discharge. This operating voltage is less than a conventional Li-ion cell which provides an operating voltage of 3.5 V during the discharge, because the reaction of $Cu_2Sb$ with Li-ions occurs at a potential more positive than the reaction of graphite with Li-ions. While this reduces the operating voltage of the cell, it also eliminates the formation of Li-metal dendrites during long cycling.

B. Electrodeposition of $Cu_2Sb$ on Copper Foam:

The direct electrodeposition of $Cu_2Sb$ onto porous three-dimensional structure and its reaction with Li-ions is described. The basic principles of electrodeposition permit the deposition of materials onto substrates with a variety of morphologies, thus the procedure for the electrodeposition of $Cu_2Sb$ can be directly applied to the electrodeposition of $Cu_2Sb$ onto porous three-dimensional structures, such as porous foam. This was performed using commercially available copper foam, (90 ppi, EFOAM) in accordance with the film deposition technology described in Part A of this EXAMPLE 1. As in Part A of EXAMPLE 1, nickel tabs were attached to the porous copper foam by means of resistive welding before the electrodeposition was carried out. The micrometer dimensions of the struts 15 and 16 making up the structure of the commercially available copper foam can be seen in FIGS. 2A and 2B. The first complexity that arises is that the potential difference $E_A$ between the working electrode and the reference electrode is affected by the solution resistance $R_s$, according to Eq (7).

$$E_A = E_{appl} + iR_s \qquad \text{Eq. (7)}$$

Thus, as the current i increases, the error caused by the solution resistance becomes larger, and the potential at the surface of the working electrode becomes less negative. In relation to the present invention, the current is proportional to the surface area of the working electrode, and working electrodes with high surface areas, such as three-dimensional porous foam structures, will produce large currents during the deposition and thus large errors in the potential. From Eq (7) it can be seen that the magnitude of this error can be decreased by decreasing the solution resistance, which can be achieved by increasing the ionic conductivity of the solution. Because the surface area of a foam substrate is much higher than a smooth substrate with the same footprint, the ionic strength of the deposition solution was increased to minimize any effect that solution resistance has on the electrodeposition of $Cu_2Sb$. The increase in ionic strength was performed using potassium nitrate ($KNO_3$, ≥99.99%, Aldrich) at a concentration just under the solubility limit which is 3.56 M at 25° C.

After increasing the ionic strength of the deposition solution describe in Part A of this EXAMPLE 1, thin uniform coatings of $Cu_2Sb$ 11 as observed in FIG. 2B were electrodeposited onto copper foam 10 using a single potential of −1.05 V versus SSCE. The deposited material 11 which like thin-films of $Cu_2Sb$, was violet in color, and was examined using XRD and SEM. The XRD results indicated that $Cu_2Sb$ with the same crystal orientation was deposited as found in the thin-films. The SEM results, FIG. 2B, demonstrated that the $Cu_2Sb$ 11 deposited uniformly over the porous structure of the foam 10 with the same surface morphology, as demonstrated by the inset of FIG. 2B, found in electrodeposited thin films of $Cu_2Sb$. From FIG. 2B, it may be observed that the deposited $Cu_2Sb$ thickness increased on the edges of the foam, as one would expect from the stronger electric fields present at these locations. The second complexity of depositing $Cu_2Sb$ onto the foam structure is that the porosity of the foam wets the deposition solution; that is, the $Cu_2Sb$ corrodes when in contact with an aqueous solution when not negatively biased. Therefore, in order to maintain the $Cu_2Sb$ in condition for the subsequent deposition of the solid polymer electrolyte, the Cu foam-$Cu_2Sb$ substrate is thoroughly rinsed and dried once removed from the $Cu_2Sb$ deposition bath. If this is not done, the deposited $Cu_2Sb$ will re-dissolve in the wetted deposition solution causing irregularities in the final deposit.

The battery testing of the electrodeposited $Cu_2Sb$ on copper foam was performed using both Swagelok half-cells and pouch full-cells in accordance with the battery testing performed in Part A of this EXAMPLE 1. In a half-cell versus Li-metal, the electrodeposited $Cu_2Sb$ on porous metallic foam demonstrated excellent rate performance with less than 1% capacity fade after 90 cycles, as illustrated in FIG. 3A. The electrodeposited $Cu_2Sb$ was charged with a current density of $2.1\times10^{-2}$ $mAcm^{-2}$ (C/5) and discharged at different current densities according to the following scheme. First, the cell was discharged at $2.1\times10^{-2}$ mA $cm^{-2}$ (C/5) for 30 cycles, then at 0.1 mA $cm^{-2}$ (1 C) for 20 cycles, followed by 10 cycles at each of the following discharge current densities: 0.52 mA $cm^{-2}$ (5 C), 1.0 mA $cm^{-2}$ (10 C), 1.6 mA $cm^{-2}$ (15 C), and 0.1 mA $cm^{-2}$ (1 C). From FIG. 3A it may also be observed that although utilization of the lithiated $Cu_2Sb$ decreased with increasing discharge current density, especially at 1.6 mA $cm^{-2}$ (15 C), upon lowering the current density to 0.1 mA $cm^{-2}$ (1 C), full utilization of the material was again restored. The decrease in utilization at the high discharge rate, 1.6 mA $cm^{-2}$ (15 C), permits the electrode to be more rapidly fully charged 19. Therefore, although the current density for the charge remained the same, $2.1\times10^{-2}$ mA $cm^{-2}$ (C/5), less than one hour was required to reach a fully charged state, as illustrated in FIG. 3B. In this case, the shorter than expected charge time is not due to material degradation, but rather to the material not being fully discharged. Examining FIG. 3B, the voltage plateau of discharge step 20 is centered at 1.0 V versus $Li/Li^+$ and the discharge lasted 15 s. The term "C-rate", as used herein, is defined as the current required to charge or discharge the material in 1 hour. The current is calculated using the active material mass and the capacity. Thus, a C/5 rate corresponds to a current that results in the cell charging or discharging in 5 hours, while a rate of 15 C would be the calculated current resulting in a discharge or charge in 4 min.

Figure 4A:
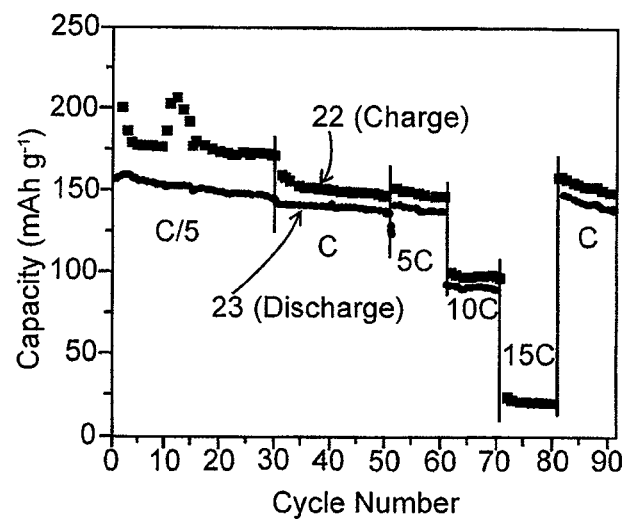
Figure 4B:
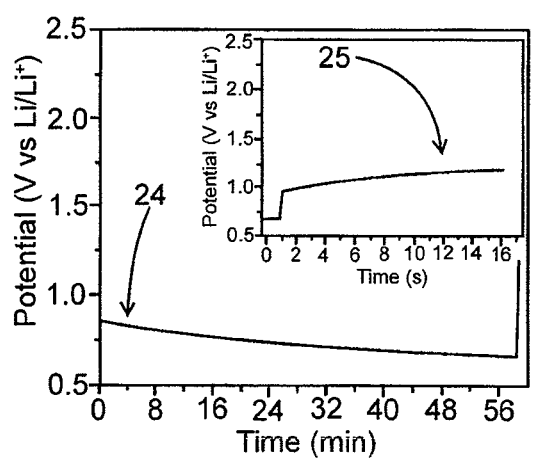
FIG. 4B shows the voltage profile of the charge and discharge (inset) of the cell, at a rate of 15 C.
Figure 5A:
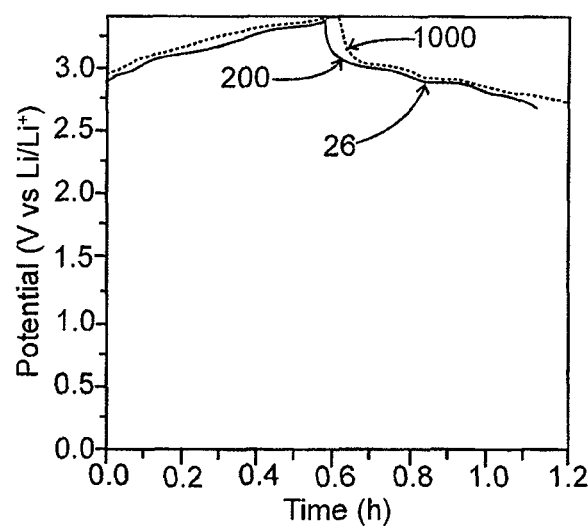
Figure 5B:
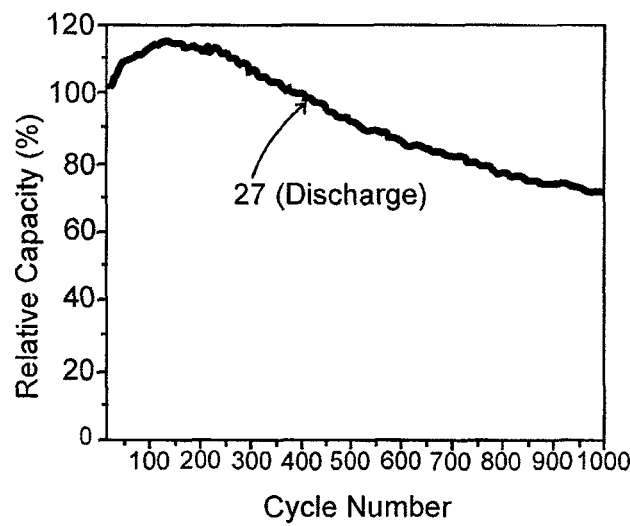
FIG. 5B shows the discharge capacity retention for the full-cell cycled at a rate of 1.8 C between 3.4-2.7 V versus Li/Li$^+$.

Another benefit of embodiments of the present invention is that the electrodeposited $Cu_2Sb$ on the porous foam structure has excellent capacity stability over a large number of cycles, compared to thin films of electrodeposited $Cu_2Sb$. To demonstrate this, pouch cells in accordance with the battery testing performed in Part A of this EXAMPLE 1, were made using the porous copper foam with electrodeposited $Cu_2Sb$. The cathode material, $LiCoO_2$, was used in excess to make the capacity retention dependent on the electrodeposited $Cu_2Sb$. The cell was cycled between 2.7 and 3.4 V versus $Li/Li^+$, charging and discharging the cell at a constant current density of 0.33 mA $cm^{-2}$ (approximately 1.8 C) with a 1 min. rest between the charge and discharge. FIG. 4 shows the discharge capacity retention, 21, of a cell cycled according to this procedure, which demonstrates that 70% of the initial capacity was maintained after 1000 cycles.

EXAMPLE 2

Electrodeposition of PPZ Solid-State Electrolyte:
  A. Electrodeposition of PPZ:
  The electrodeposition of a phosphazene polymer onto the porous three-dimensional structure to act as a solid-state electrolyte is described. After the $Cu_2Sb$ has been electrodeposited onto or as the porous foam structure, as describe in Part B of EXAMPLE 1, the next step in the fabrication of an interpenetrating solid-state Li-ion battery is the electrodeposition of a uniform thin solid-state electrolyte onto the surface of the $Cu_2Sb$. To accomplish this, a solution of supporting electrolyte consisting of 0.1 M tetrabutylammonium perchlorate (electrochemical grade, ≥99.0%, Fluka) in acetonitrile (anhydrous, ≥99.8%, Aldrich) with 0.05 M hexachlorocyclotriphosphazene monomer (≥99.99%, Aldrich) and 0.05 M 1,4-naphthoquinone (puriss, ≥98.5% Fluka) crosslinker is degassed with $N_2$ sparging. In the absence of crosslinking, hexachlorocyclotriphosphazene was found to polymerize in a pseudo-two-dimensional network which results in a polymer that is too hydrophilic. Crosslinking provides a more three-dimensional network that is more hydrophobic, thereby making it a more robust coating on the surface of the $Cu_2Sb$. Before use, the acetonitrile was further purified using fractional distillation from calcium hydride, and stored over activated 3 Å molecular sieves. Solution preparation and use were undertaken in an oxygen- and water-free glove box (<1 ppm of $O_2$ and $H_2O$). The electropolymerization of the solid-state electrolyte onto the $Cu_2Sb$ is performed using a standard three-electrode cell with (1) $Ag/Ag^+$ reference electrode; (2) two vitreous carbon counter electrodes (20 ppi, 3%, KR Reynolds); surrounding the (3) porous copper foam or foil with electrodeposited $Cu_2Sb$ as the working electrode (approximately 3 $cm^2$). A Pt electrode (0.20 $cm^2$) was also used as the working electrode in the three-electrode cell. The $Cu_2Sb$ surface was cleaned prior to use in electrochemical experiments by soaking in a 10% nitric acid (ACS reagent, ≥90.0%, Aldrich) solution for 10 s, rinsing with Millipore water, and electrochemically polished by cycling in standard electrolyte solution in the glove box over the voltage range for reduction of any remaining oxide film. The solid-state electrolyte layer was deposited using cyclic voltammetry by sweeping the potential from −0.85 to −1.3 V versus $Ag/Ag^+$, 30 times.

To determine if this produced uniform pinhole free coatings of the solid-state electrolyte, redox shutoff experiments are conducted in ruthenium tris bipyridyl redox permeant solutions. These solutions consisted of 10 mM tris(2,2'-bipyridyl)ruthenium(II) hexafluorophosphate (95%, Aldrich), 10 mM tris(dimethylbipyridine) ruthenium (II) hexafluorophosphate (synthesized), and 0.1 M tetrabutylammonium tetrafluoroborate (≥99.9%, Fluka) in purified acetonitrile. The tetrabutylammonium tetrafluoroborate was recrystallized in water prior to use. The redox shutoff experiments were conducted using a three-electrode cell, with a platinum mesh counter electrode, $Ag/Ag^+$ reference electrode, and the platinum electrode or the porous copper foam, with electrodeposited $Cu_2Sb$, and the electrodeposited solid-state electrolyte as the working electrode. A PPZ solid-state electrolyte electrodeposited on a planar substrate following the above procedure was used to measure: (1) the film thickness with atomic force microscopy (AFM); (2) the electrochemical stability window; and (3) ionic conductivity using A.C. electrochemical impedance spectroscopy (EIS). For the electrochemical stability and the EIS contact is made to the fragile polymer surface with GaIn metal eutectic, after the PPZ film was soaked for 1 h in a 1 M $LiPF_6$ solution in propylene carbonate (anhydrous, ≥99.7%, Aldrich), rinsed in neat propylene carbonate, and dried under vacuum.

Figure 6A:
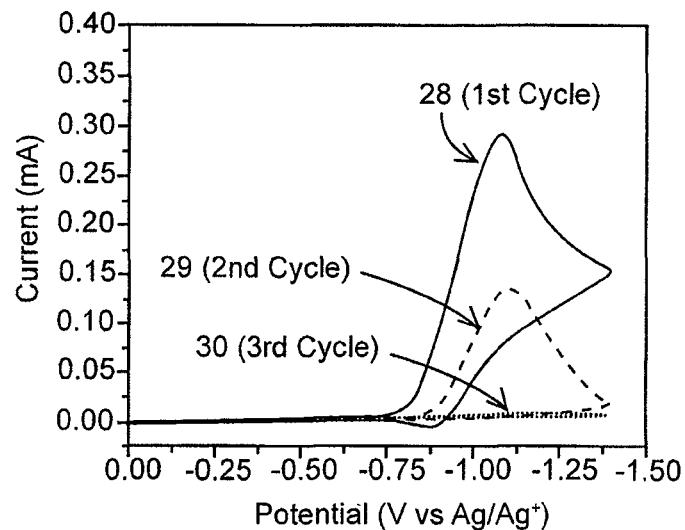
Figure 6B:
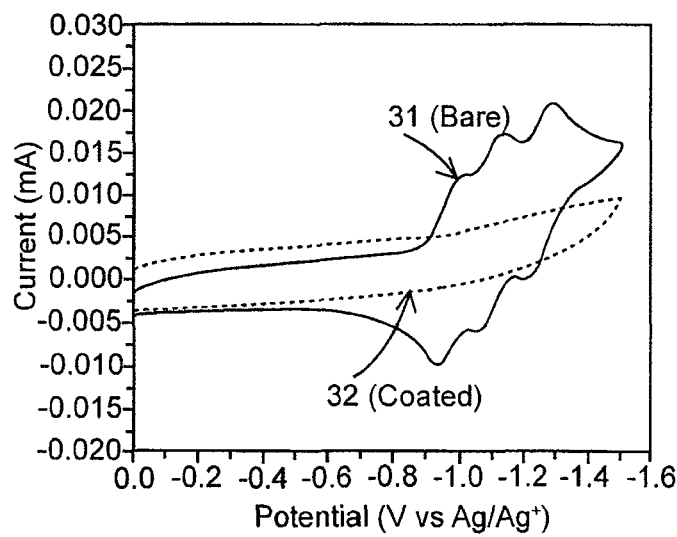
FIG. 6B shows the redox shutoff measurements performed for the PPZ deposited on a Pt electrode, CVs of the ruthenium (Ru)-complex deposited on the Pt electrode before and after the PPZ deposition illustrating the electrode passivation.

B. Electrodeposition of PPZ on Pt Electrode:
The results of electrodeposition of PPZ onto a Pt electrode and its dielectric properties are described. Preliminary results of the EC electrodeposition onto Pt working electrode were promising. FIG. 6A shows the electrodeposition of the phosphazene precursor with 1,4-naphthoquinone in acetonitrile onto a Pt electrode, as seen from the change in charge passed during subsequent reductive sweeps, this redox couple shows very rapid self-limiting deposition (important for conformal coating as discussed hereinabove). After three voltage sweeps, the surface of the working electrode is sufficiently passivated/insulated to disallow further electrochemistry. To further demonstrate a complete coverage of the electrode surface with a material acting as a dielectric, a redox shutoff experiment was performed. This is conducted by comparing the charged passed on an uncoated film to the charged passed on a PPZ coated film during cyclic voltammetry in the redox permeant solution discussed above. FIG. 6B shows a CV collected in a solution of a redox probe (here a ruthenium metal complex) before, 31, and after, 32, the deposition of the PPZ film. The reduction of charged passed and absence of distinct peaks in the CV of the PPZ-coated electrode 32 compared to the CV of the bare electrode 31 illustrates the "shutoff" of the current due to the redox couple of ruthenium species, demonstrating a pinhole free insulating film has been deposited on to the electrode.

Figure 7A:
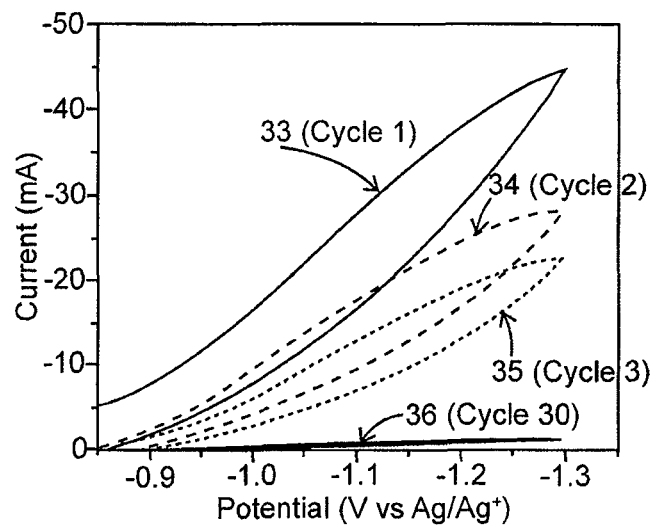
Figure 7B:
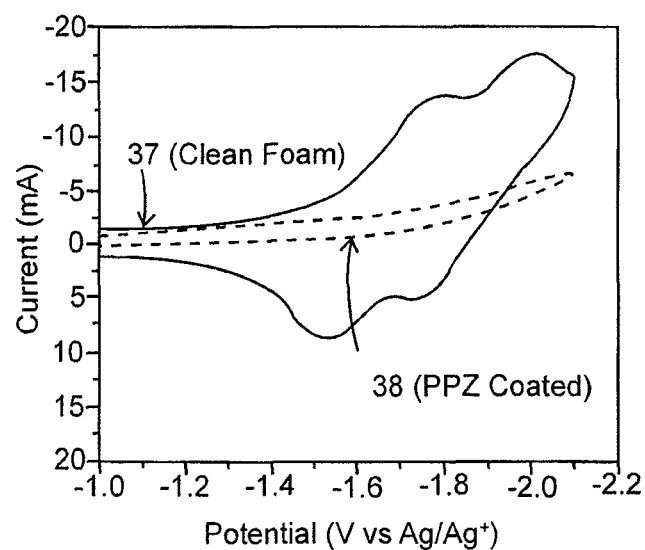
FIG. 7B illustrates the redox shutoff measurements for the bare and PPZ-coated, porous copper foam.
Figure 8A:
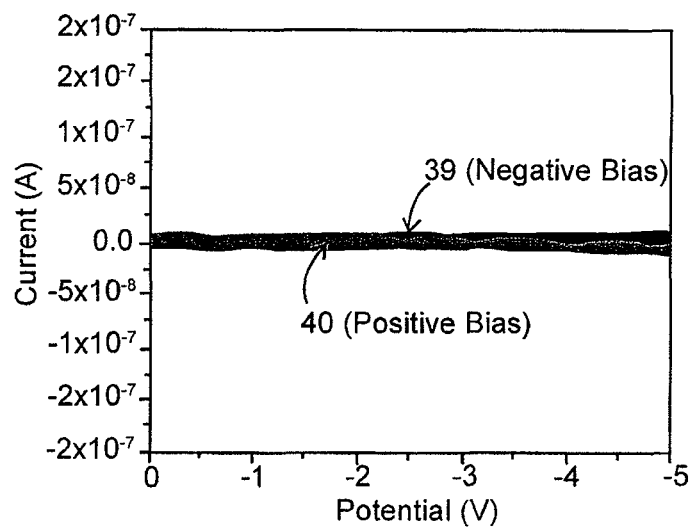
Figure 8B:
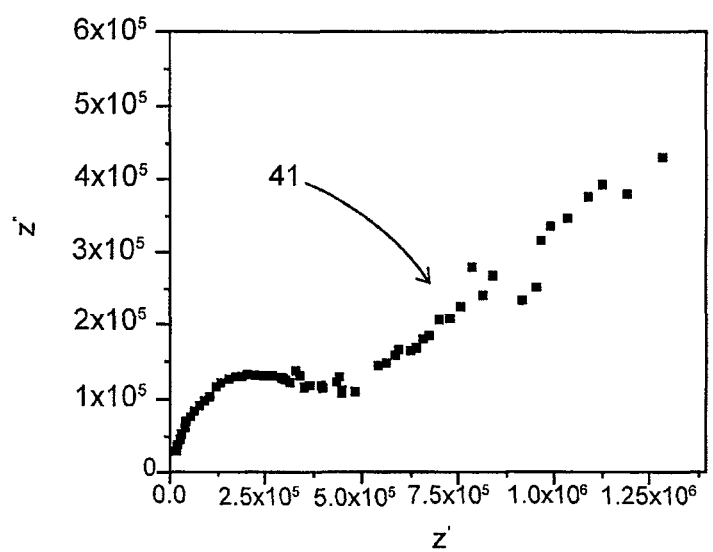
FIG. 8B illustrates a Nyquist plot of the electrodeposited PPZ, showing the electronic resistance and ionic conductance of the solid-state electrolyte.

C. Electrodeposition of PPZ on three-dimensional porous Material:

The results of the electrodeposition of PPZ onto $Cu_2Sb$ coated porous foam are described. FIG. 7A shows the electrodeposition of a polyphosphazene film onto high surface area porous copper form with electrodeposited $Cu_2Sb$, as described in Part B of EXAMPLE 1. The charge passed during the reductive sweep greatly diminished with each scan as the $Cu_2Sb$ surface is progressively blocked by an insulating PPZ layer. After 30 potential sweeps, 36, between 0.85 and −1.3 V versus $Ag/Ag^+$ the charged passing during the reductive sweep has dropped by a factor of 20 and shows little change with further sweeps, indicating a fully coated surface. While not visible to the unassisted eye, the PPZ-coated porous copper foam with electrodeposited $Cu_2Sb$ shows a slight increase in mechanical rigidity. Atomic Force Microscopy (AFM) images of a PPZ layer electrodeposited on planar substrate with electrodeposited $Cu_2Sb$ show that a uniform layer with a thickness of approximately 400 nm was formed. The reduction in charge, as demonstrated by FIG. 7A, during the deposition indicates the deposited layer acts as a dielectric material. This conclusion is further supported with evidence obtained by testing the deposited layer in a redox shutoff experiment. FIG. 7B shows the electrochemistry of the electrodeposited $Cu_2Sb$ on the porous copper foam before, 37, and after, 38, coating with insulating PPZ in a ruthenium trisbipyridyl redox permeant solution. The reduction in charge passed and the change in peak shape indicate a uniform pinhole free coating on the surface of the $Cu_2Sb$. FIG. 8A shows linear sweep voltammograms, 39, and, 40, for a PPZ coated $Cu_2Sb$ film deposited with the same procedure described above but on a planar surface. The film is electronically insulating passing low current (<100 nA $cm^{-2}$) between +5.0 and −5.0 V followed by dielectric breakdown beyond 5.0 V. Using EIS, the ionic conductivity of the electrodeposited polymer on a planar film was measured after the polymer was soaked for 1 h in the standard three-component battery electrolyte solution, as describe in Part A of EXAMPLE 1, and then dried. The soaking incorporates both lithium salt and plasticizing solvent species into the polymer which is imperative to achieve good ionic conductivity. FIG. 8B shows the Nyquist plot, 41, from the EIS measurement which demonstrates low ionic mobility in the film, with an approximate ionic conductivity of $1\times10^{-9}$ S $cm^{-1}$. Optimization of side groups, deposition, and soaking time can lead to higher conductivities and highly controllable thickness.

EXAMPLE 3

Cathode Preparation:

A. $LiMn_{1.42}Ni_{0.42}Co_{0.16}O_4$ Synthesis:

The results of the synthesis and characterization of Si(IV) doped $LiMn_{1.42}Ni_{0.42}Co_{0.16}O_4$ are described. Nanoparticles of $LiMn_{1.42}Ni_{0.42}Co_{0.16}O_4$ doped with Si(IV) were synthesized at approximately 25° C. and 630 torr. In a typical synthesis, 38.7 mmol manganese(II) acetate tetrahydrate (MnAc, 98%, Aldrich), 11.4 mmol nickel(II) acetate tetrahydrate (NiAc, 98%, Aldrich) and 4.37 mmol cobalt(II) acetate tetrahydrate (CoAc, ≥98.0% Riedel-de Haen) were dissolved in Millipore water (18 MΩ×cm at about 25° C.) by stirring vigorously for approximately 30 min. Simultaneously, 164 mmol potassium hydroxide (KOH, ACS grade) was dissolved in Millipore water by stirring. Once it was confirmed by visual inspection that all of the solid precursors are dissolved, the solution containing the KOH was quickly poured into the solution containing the transition metal acetates. The rapid addition of KOH into the acetate solution is necessary to induce an instantaneous nucleation event thereby resulting in an average particle diameter on the nanoscale as well as a narrow size distribution. The reaction was allowed to proceed between 30 min. and 60 min, during which the reaction mixture color changed from a translucent pink, which is due to the dissolved acetates, to a blue particle suspension. This occurs because the KOH drives a hydroxide co-precipitation reaction of the transition metals while the acetate anion remains dissolved in solution and is electronically balanced by the potassium cation. As the reaction proceeds, the suspension color changes from blue to green and finally to brown, which indicates that the reaction has gone to completion.

The co-precipitated transition metal hydroxide nanoparticles were purified by centrifuging and discarding the supernatant, and washing with Millipore water. This process was repeated three times. The solid was then transferred to a crystallization dish and dried in air at 100° C. Once dried, the solid was ground together with 32.8 mmol of lithium hydroxide monohydrate (LiOH, ≥98.0%, Aldrich) using a mortar and pestle. The solid was then transferred to a quartz container, which serves both as the vessel for which the solid is heated as well as the source of silicon, and heated at 1° C. $min^{-1}$ from 25° C. to 900° C. The temperature was held constant at about 900° C. for 12 h, and then reduced to room temperature by natural convection. The resulting black powder was then characterized by SEM-EDS, XRD, differential thermal analysis (DTA), and electrochemical cycling techniques.

To test the lithiation of the synthesized cathode material preliminary cycling was performed in Swagelok cells versus Li-metal and $Cu_2Sb$. The first cell was a two-electrode half-cell with Li-metal as the negative electrode and $LiMn_{1.42}Ni_{0.42}Co_{0.16}O_4$ doped with Si(IV) nanoparticles in a binder as the positive electrode. The nanoparticle positive electrode was prepared by combining approximately 60% NMP, about 28% nanoparticles, approximately 8% graphite, and about 4% PVDF by weight. The resulting slurry was spread on aluminum foil and heated to about 60° C. under air for 1 h followed by heating at 110° C. under vacuum for 90 min. The second cell configuration was also a two-electrode cell consisting of electrodeposited $Cu_2Sb$ as the negative electrode and $LiMn_{1.42}Ni_{0.42}Co_{0.16}O_4$ doped with Si(IV) nanoparticles in a binder as the positive electrode. In both cells a non-aqueous liquid electrolyte was used which consisted of 1M $LiPF_6$ in a DEC/EC solution (7:3 by vol.). The geometric electrode surface area for both of these cells was 0.32 $cm^2$. The oxide nanoparticle half-cell was cycle between and 3.0 and 4.85 V versus $Li/Li^+$, respectively, and the full-cell was cycled between 3.5 and 4.25 V versus $Li/Li^+$.

Figure 9:
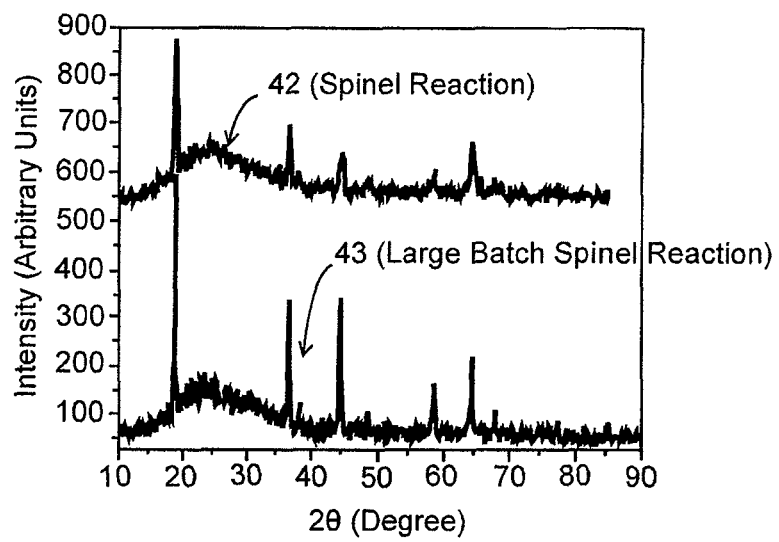
FIG. 9 illustrates powder x-ray diffraction (XRD) patterns of synthesized $LiMn_{1.42}Ni_{0.42}Co_{0.16}O_4$ nanoparticles doped with silicon (Si(IV)), showing the XRD pattern of the small-scale preparation of the material, and the corresponding XRD pattern of the large-scale preparation thereof.
Figure 10A:
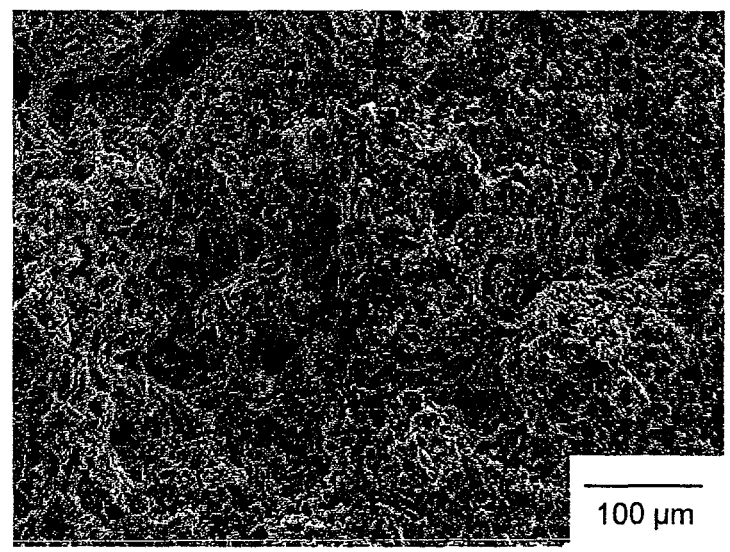
Figure 10B:
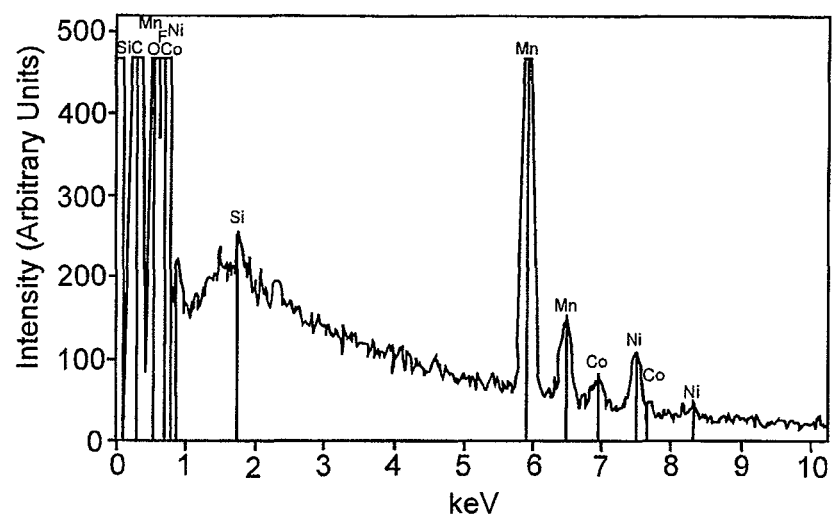
FIG. 10B is the corresponding energy-dispersive x-ray (EDS) spectra demonstrating the presence of the elemental constituents—manganese, nickel, cobalt, and silicon.
Figure 11:
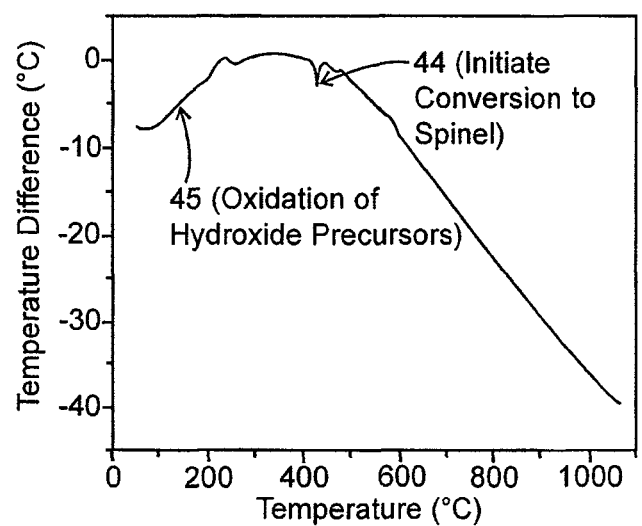
FIG. 11 is a differential thermal analysis (DTA) thermogram of the hydroxide precursor illustrating the conversion to phase-pure cubic $LiMn_{1.42}Ni_{0.42}Co_{0.16}O_4$ doped with Si(IV), which proceeds first through the oxidation of the precursors and then through the initiation of the conversion to the spinel.

A powder sample acquired from the synthesis procedure described above was first characterized by XRD and SEM-EDS to ensure the correct crystalline structure was synthesized and the appropriate elements were not incorporated into the sample as an impurity phase without the desired properties, which can be prominent. FIG. 9 shows two XRD patterns, the first being that of the first successful nanoparticle synthesis of $LiMn_{1.42}Ni_{0.42}Co_{0.16}O_4$ doped with Si(IV), 42, and the second being nanoparticles synthesized in a larger, 5 g, batch, 43. In both cases, all of the peaks can be indexed to cubic lithium manganese nickel cobalt oxide (Fd-3m) thereby demonstrating that the prominent crystalline impurity is not present. This is important because the layered rhombohedral crystal structure impurity does not exhibit the desired properties. To confirm that silicon had been incorporated into the $LiMn_{1.42}Ni_{0.42}Co_{0.16}O_4$, an SEM-EDS analysis was conducted. FIGS. 10A and 10B contain a SEM image with a corresponding EDS spectrum. FIG. 10B shows that manganese, nickel, and cobalt were all detected as well as a smaller peak indicating the presence of silicon in the sample. The peak intensity of silicon is much smaller when compared to manganese, nickel, and cobalt demonstrating that it is present in the sample at a much lower concentration. This is evidence that the Si(IV) could have been substituted into the crystal structure for Mn(IV) or be present as a coating. To determine whether a temperature lower than 900° C. can be used to synthesize phase-pure cubic $LiMn_{1.42}Ni_{0.42}Co_{0.16}O_4$ doped with Si(IV), a Differential Thermal Analysis (DTA) was conducted. FIG. 11 contains a DTA thermogram that highlights the initial conversion of the hydroxide precursors at approximately 200° C. to oxides, 45, and then the beginning of the subsequent conversion to the cubic spinel, 44, at approximately 400° C. While this indicates that the cubic spinel may be synthesized at temperatures lower than 400° C., additional experimentation demonstrated that the product is not phase pure unless the final baking temperature is 900° C.

Figure 12A:
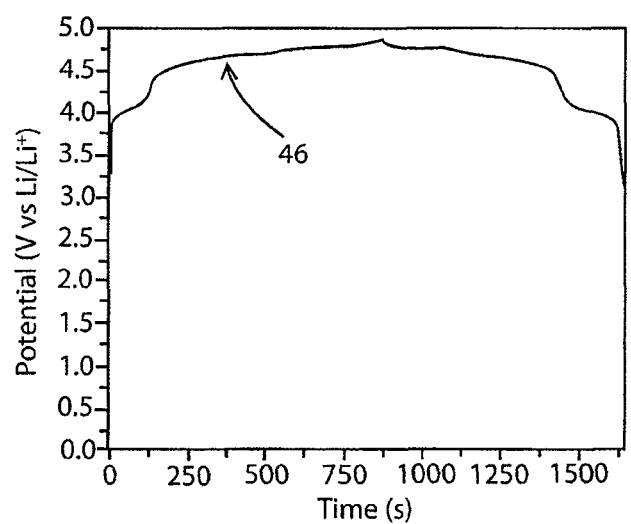
Figure 12B:
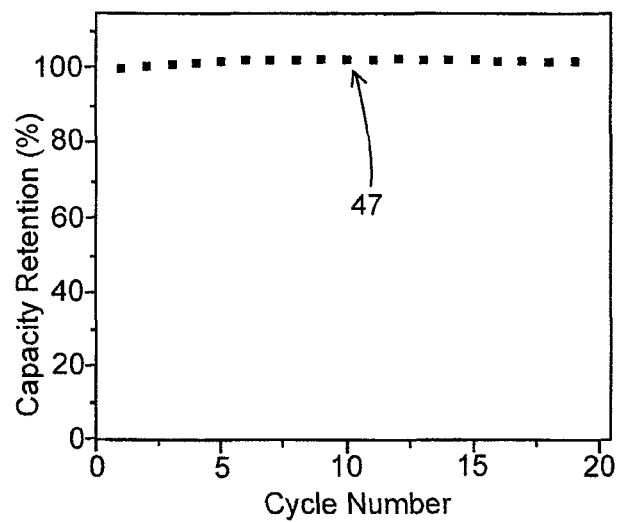
FIG. 12B shows the discharge capacity retention of the cell, which included $LiMn_{1.42}Ni_{0.42}Co_{0.16}O_4$ nanoparticles in a standard binder that contained PVDF and graphite as the positive electrode with an aluminum current collector, a commercially available polypropylene-based porous separator to electrically isolate the anode and cathode, a liquid electrolyte including a 3:7 ratio by mass of ethylene carbonate:dimethylcarbone with a 1 M LiPF$_6$, and a disk of lithium metal as the negative electrode with a 316 SS current collector.
Figure 13A:
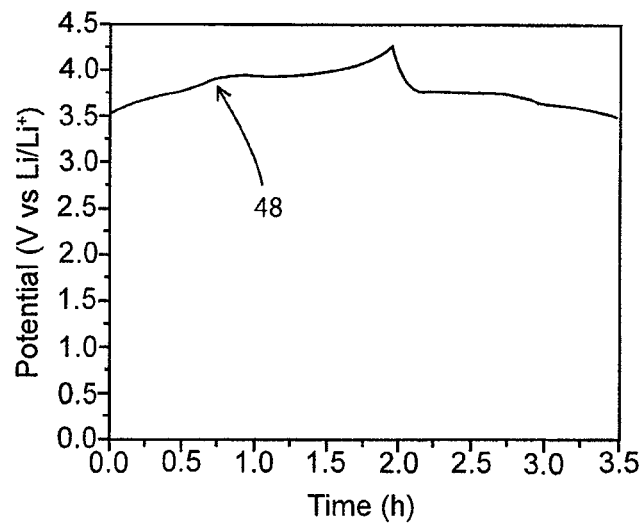
Figure 13B:
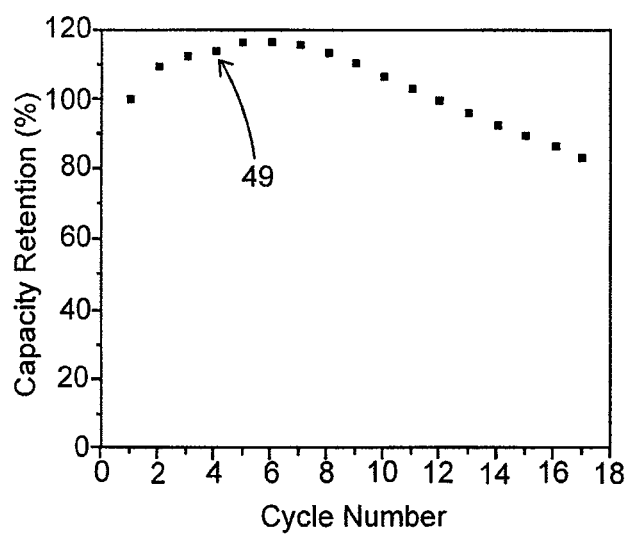
FIG. 13B shows the discharge capacity retention of the cell, which included $LiMn_{1.42}Ni_{0.42}Co_{0.16}O_4$ nanoparticles in a standard binder that contained PVDF and graphite as the positive electrode with an aluminum current collector, a commercially available polypropylene-based porous separator to electrically isolate the anode and cathode, a liquid electrolyte including a 3:7 ratio by mass of ethylene carbonate:dimethylcarbone with 1 M LiPO$_6$, and electrodeposited Cu$_2$Sb on a copper current collector as the negative electrode.

B. Electrochemical Properties of Synthesized $LiMn_{1.42}Ni_{0.42}Co_{0.16}O_4$:

The electrochemical performance of $LiMn_{1.42}Ni_{0.42}Co_{0.16}O_4$ in Li-ion cells is described. After determining that the synthesized nanoparticles were pure cubic $LiMn_{1.42}Ni_{0.42}Co_{0.16}O_4$ doped with Si(IV), characterization of the material's electrochemical properties was performed. FIGS. 12A and 12B and FIGS. 13A and 13B illustrate different aspects of the nanoparticle cathode material as well as the combination of the cathode material with electrodeposited $Cu_2Sb$, as described in Part B of EXAMPLE 1. FIG. 12A illustrates the characteristic voltage profile, 46, of the $LiMn_{1.42}Ni_{0.42}Co_{0.16}O_4$ doped with Si(IV) nanoparticles when cycled in a half-cell versus Li-metal. The two highest voltage charge and discharge plateaus that occur approximately between 4.6 and 4.8 V versus Li/Li$^+$ are due to the Ni(II/III) and Ni(III/IV) redox couples. The lowest charge and discharge plateau is due to the Mn(III/IV) redox couple. However, this redox couple is typically not utilized as it's potential is significantly lower, approximately 0.7 V versus Li/Li$^+$, than the nickel redox couples. FIG. 12B contains a plot of the discharge capacity retention, 47, as a function of cycle number. As demonstrated by the plot, the cathode nanoparticles retain approximately 100% of the initial discharge after 20 cycles. This further demonstrates that the incorporation of Si(IV) into the nanoparticles has a beneficial effect as unmodified $LiMn_{1.42}Ni_{0.42}Co_{0.16}O_4$ nanoparticles experience observable capacity fade within the first 5 cycles which continues to increase with an increase in cycle number. FIGS. 13A and 13B contain the voltage profile and capacity retention data, respectively, of a full-cell containing the cubic spinel cathode nanoparticles and electrodeposited $Cu_2Sb$. As illustrated by the voltage profile, 48, in FIG. 13A, the full-cell has a discharge potential of approximately 3.7 V versus Li/Li$^+$. Compared to the operating voltage from the $LiCoO_2$—$Cu_2Sb$ cell discussed in Part B of EXAMPLE 1, the operating voltage obtained with the synthesized $LiMn_{1.42}Ni_{0.42}Co_{0.16}O_4$ is on par with conventional Li-ion cells. However, the discharge capacity retention, 49, drops, to approximately 80% of the initial capacity by the 20$^{th}$ cycle as seen in FIG. 13B.

The shape of the capacity retention in FIG. 13B is similar to that observed in the inset of FIG. 3A and indicative of $Cu_2Sb$ pulverization which occurs upon over lithiation, as discussed in Part A of EXAMPLE 1. The conclusion that the poor capacity retention is due to $Cu_2Sb$ pulverization is further supported by the good capacity retention observed of the half-cell the synthesize cathode material versus Li-metal, FIG. 12B. The increase in pulverization observed in FIG. 12B over that seen in FIG. 3A may be attributed to high water content found in the liquid electrolyte. As discussed in Part A of EXAMPLE 1 the pulverization of $Cu_2Sb$ during cycling can be inhibited by choosing a potential cutoff that is just after the second lithiation plateau of $Cu_2Sb$. Such a cutoff should permit the complete lithiation of $Cu_2Sb$ to $Li_3Sb$ without allowing further reaction of the anode with Li-ions forming excess SEI and Li-metal which causes the extreme pulverization of the material. In the case of full-cells of electrodeposited $Cu_2Sb$ versus the synthesized $LiMn_{1.42}Ni_{0.42}Co_{0.16}O_4$ using a potential cutoff of around 4 V versus Li/Li$^+$ should improve the capacity retention of the full-cell.

C. Cathode Slurry Preparation for Interpenetrating Cell:

The preparation and casting of a cathode slurry onto a three-dimensional structure is described. Electrodeposition of a solid-state electrolyte is a proven technique that can provide a uniform, defect free coating onto complex three-dimensional structures, such as porous foam. As described by Part B of EXAMPLE 2, PPZ is electrodeposited onto a porous copper foam structure that surface is covered with electrodeposited $Cu_2Sb$ which functions as the anode material. This porous foam structure with the $Cu_2Sb$ and solid-state electrolyte layers acts as a template for the cathode material as it infiltrates the void space, thereby resulting in a Li-ion cell with interpenetrating negative and positive electrodes. However, the use of NMP to make the cathode slurry is unacceptable as it can dissolve PPZ under mild conditions. It was determined that triethyl phosphate can be used in place of NMP since it does not damage the electrodeposited PPZ solid-state electrolyte while also permitting the use of PVDF as the binder in the positive electrode. Triethyl phosphate and PVDF slurries consisting of $LiCoO_2$ (99.8%, Aldrich) and $LiFePO_4$ (99.5%, MTI), $LiMn_{1.42}Ni_{0.42}Co_{0.16}O_4$ and particulate graphite, as the conductor, were generated for the positive electrode. Each material was ball milled in a planetary ball mill with an alumina ceramic casing and milling balls. Typically, 10 mL of isopropyl alcohol, 5 g of material, and 4 ceramic milling balls were placed into the ceramic casing and spun at 240 rpm for 30 min. followed by a 30 min. pause to dissipate heat. This was repeated 24 times. This process reduced the particle size to sub-500 nm. After the ball milling process, the cathode material, conductor, and binder were combined where the composition was 82%, 10%, and 8% by weight, respectively. Triethyl phosphate was then added in the amount of 1.5 times the combined weight of the cathode, conductor, and binder and stirred until the binder was completely dissolved. Depending on the foam void space, pore density, and average pore size, the viscosity of the slurry may need to be decreased, which is accomplished by adding additional triethyl phosphate.

Once the appropriate viscosity is ascertained, the slurry can be added dropwise, or through other appropriate liquid coating processes such as slot dye coating, while also ensuring that the slurry completely percolates through the foam structure; thereby contacting the aluminum underneath the foam which is the positive electrode current collector. After the slurry dries, a voltage may be measured and should be approximately 300 mV when $Cu_2Sb$ is the anode material and $LiCoO_2$ is the cathode material. Additionally, the internal resistance when measured using a digital multimeter should be on the order of $10^6 \Omega$.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A lithium-ion battery comprising in combination:
   a three-dimensional conducting porous foam current collector, having constant conductivity in the presence of lithium atoms or ions, and having an intermetallic material electrodeposited thereon, forming thereby a porous anode;
   an integral separator and solid-state electrolyte, comprising at least one polyphosphazene, conformally electrodeposited onto said anode for providing high resistance to electrical current and lithe resistance to the passage of lithium ions; and
   cathode material filling the pores in said coated anode.

2. The lithium-ion battery of claim 1, wherein the intermetallic material comprises $Cu_2Sb$.

3. The lithium-ion battery of claim 1, wherein said conducting porous foam comprises metals chosen from copper and nickel.

4. The lithium-ion battery of claim 1, wherein said at least one polyphosphazene comprises polyhexachlorocyclotriphosphazene.

5. The lithium-ion battery of claim 4, wherein the polyhexachlorocyclotriphosphazene is corsslinked.

6. The lithium-ion battery of claim 5, wherein the crosslinker comprises 1,4-naphthoquinone.

7. The lithium-ion battery of claim 1, wherein said solid-state electrolyte is reductively polymerized onto said anode.

8. The lithium-ion battery of claim 1, wherein said cathode material is chosen from at least one of $LiCoO_2$, $LiMnO_2$, $LiMn_{1.42}Ni_{0.42}Co_{0.6}O_4$, $Li_{1.5}Ni_{0.25}Mn_{0.75}O_{2.5}$, $LiNi_{0.5}Mn_{1.5}O_4$, $LiFePO_4$, $LiMnPO_4$, and 2,5-dimercapto-1,3,4-thiadiazole.

9. The lithium-ion battery of claim 8, wherein said cathode material further comprises a binder.

10. The lithium-ion battery of claim 9, wherein the binder comprises polyvinylidene fluoride.

11. The lithium-ion battery of claim 8, wherein said cathode material further comprises a carbon-based conducting additive.

12. The lithium-ion battery of claim 11, wherein the carbon-based additive comprises graphite.

13. A lithium-ion battery comprising in combination:
    an electrodeposited intermetallic, three-dimensional porous foam anode, which does not support dendritic growth of metallic lithium;
    an integral separator and solid-state electrolyte, comprising at least one polyphosphazene, conformally electrodeposited onto said anode material for providing high resistance to electrical current and little resistance to the passage of lithium ions; and
    cathode material filling the pores of said coated anode.

14. The lithium-ion battery of claim 13, wherein the intermetallic anode comprises $Cu_2Sb$.

15. The lithium-ion battery of claim 14, wherein said $Cu_2Sb$ is doped with a metallic element.

16. The lithium-ion battery of claim 15, wherein said metallic element is chosen from copper and nickel.

17. The lithium-ion battery of claim 13, wherein said at least one polyphosphazene comprises polyhexachlorocyclotriphosphazene.

18. The lithium-ion battery of claim 17, wherein the polyhexachlorocyclotriphosphazene is corsslinked.

19. The lithium-ion battery of claim 18, wherein the crosslinker comprises 1,4-naphthoquinone.

20. The lithium-ion battery of claim 13, wherein said solid-state electrolyte is reductively polymerized onto said anode.

21. The lithium-ion battery of claim 13, wherein said cathode material is chosen from at least one of $LiCoO_2$, $LiMnO_2$, $LiMn_{1.42}Ni_{0.42}Co_{0.5}O_4$, $Li_{1.5}Ni_{0.25}Mn_{0.75}O_{2.5}$, $LiNi_{0.5}Mn_{1.5}O_4$, $LiFePO_4$, $LiMnPO_4$, and 2,5-dimercapto-1,3,4-thiadiazole.

22. The lithium-ion battery of claim 21, wherein said cathode material further comprises a binder.

23. The lithium-ion battery of claim 22, wherein the binder comprises polyvinylidene fluoride.

24. The lithium-ion battery of claim 21, wherein said cathode material further comprises a carbon-based conducting additive.

25. The lithium-ion battery of claim 24, wherein the carbon-based additive comprises graphite.

* * * * *